(12) United States Patent
Hayashi et al.

(10) Patent No.: US 10,757,108 B2
(45) Date of Patent: Aug. 25, 2020

(54) INFORMATION PROCESSING APPARATUS, COMPUTER-READABLE RECORDING MEDIUM, AND INFORMATION PROCESSING SYSTEM

(71) Applicants: Yusuke Hayashi, Kanagawa (JP); Yoshimi Satoh, Tokyo (JP)

(72) Inventors: Yusuke Hayashi, Kanagawa (JP); Yoshimi Satoh, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 452 days.

(21) Appl. No.: 15/371,317

(22) Filed: Dec. 7, 2016

(65) Prior Publication Data
US 2017/0180387 A1   Jun. 22, 2017

(30) Foreign Application Priority Data

Dec. 18, 2015   (JP) ................................. 2015-247852

(51) Int. Cl.
*G06F 21/12*   (2013.01)
*H04L 29/06*   (2006.01)

(52) U.S. Cl.
CPC .......... *H04L 63/102* (2013.01); *G06F 21/121* (2013.01); *H04L 2463/101* (2013.01)

(58) Field of Classification Search
CPC ......................... G06F 21/121; H04L 2463/101
See application file for complete search history.

(56) References Cited

U.S. PATENT DOCUMENTS

| | | | | |
|---|---|---|---|---|
| 5,138,712 A | * | 8/1992 | Corbin | G06F 21/105 705/59 |
| 5,790,664 A | * | 8/1998 | Coley | G06F 21/10 709/203 |
| 8,015,114 B1 | * | 9/2011 | Nachenberg | G06F 21/564 705/59 |
| 8,539,595 B2 | * | 9/2013 | Tsuboi | G06F 21/10 705/51 |
| 8,560,454 B1 | * | 10/2013 | Bhatia | G06F 21/10 380/262 |

(Continued)

FOREIGN PATENT DOCUMENTS

| | | |
|---|---|---|
| JP | 2011-065296 | 3/2011 |
| JP | 2012-022621 | 2/2012 |

OTHER PUBLICATIONS

U.S. Appl. No. 15/143,602, filed May 1, 2016.

*Primary Examiner* — Matthew T Henning
(74) *Attorney, Agent, or Firm* — Harness, Dickey & Pierce, P.L.C.

(57) ABSTRACT

An information processing apparatus includes a memory and at least one processor. The memory stores correspondence information associating application identification information, identifying installed applications, with usage authorization information, related to usage authorization of the applications. The processor, upon a request being received from an application requesting the usage authorization information, can specify usage authorization information associated with the application identification information included in the request. The processor can then notify the application of the requesting source, requesting the usage authorization information.

13 Claims, 19 Drawing Sheets

(56) References Cited

U.S. PATENT DOCUMENTS

| | | | |
|---|---|---|---|
| 9,003,541 B1* | 4/2015 | Patidar | G06F 21/121 |
| | | | 713/159 |
| 2002/0067503 A1* | 6/2002 | Hiatt | G06K 15/00 |
| | | | 358/1.15 |
| 2003/0191958 A1* | 10/2003 | Gartside | G06F 21/121 |
| | | | 726/27 |
| 2004/0117784 A1* | 6/2004 | Endoh | G06F 21/10 |
| | | | 717/169 |
| 2005/0044016 A1* | 2/2005 | Irwin | G06F 21/10 |
| | | | 705/30 |
| 2008/0027742 A1* | 1/2008 | Maeda | G06F 21/105 |
| | | | 705/1.1 |
| 2008/0209569 A1* | 8/2008 | Araki | G06F 21/105 |
| | | | 726/26 |
| 2010/0100778 A1* | 4/2010 | Sullivan | H04L 12/00 |
| | | | 714/57 |
| 2011/0066721 A1 | 3/2011 | Shinomiya | |
| 2012/0017199 A1 | 1/2012 | Ogura | |
| 2016/0119491 A1 | 4/2016 | Takeda | |
| 2016/0149885 A1 | 5/2016 | Negoro | |
| 2016/0165088 A1 | 6/2016 | Saitoh | |
| 2016/0182610 A1 | 6/2016 | Satoh | |
| 2016/0350519 A1* | 12/2016 | Pattyn | G06F 21/10 |

\* cited by examiner

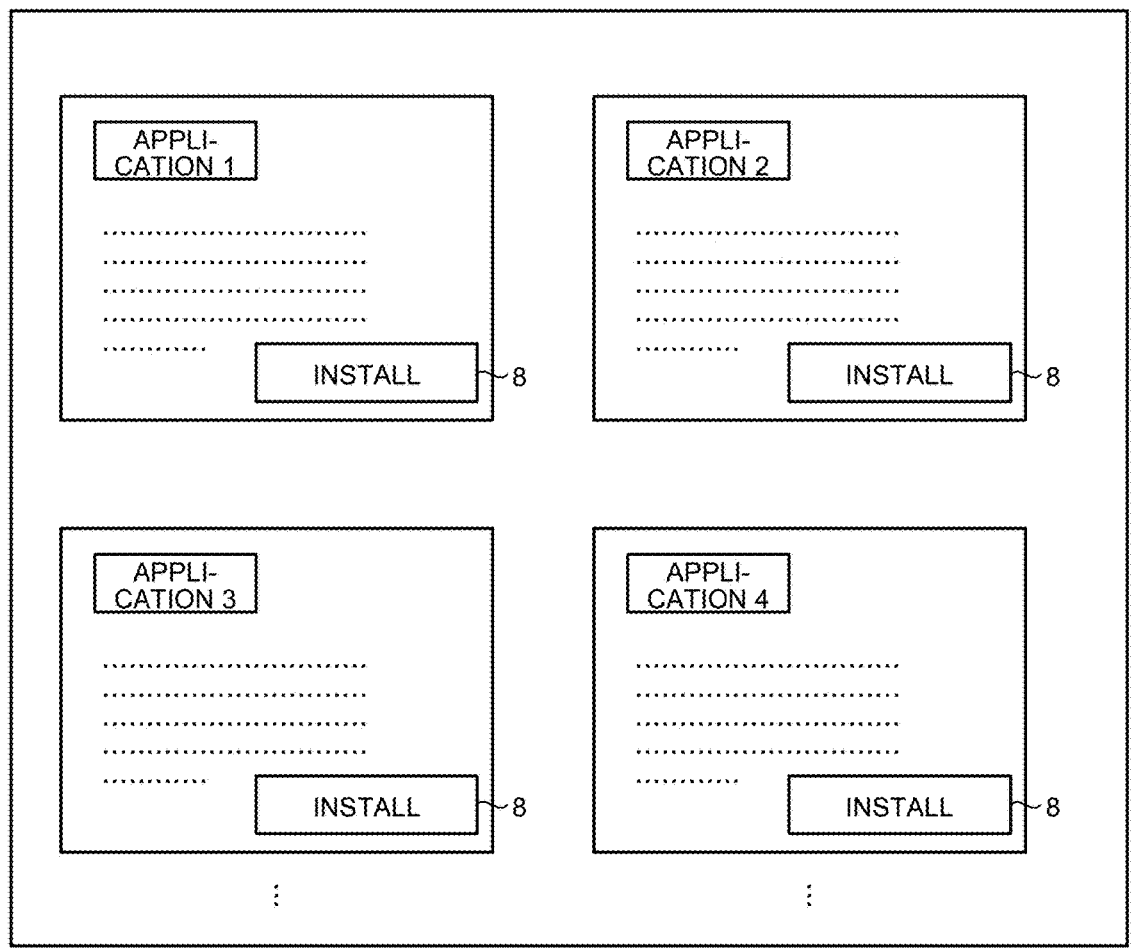

FIG.13

| PRODUCT ID | |
|---|---|
| VERSION INFORMATION | |
| DEPENDENCY COMPONENT INFORMATION | PRODUCT ID/MODULE ID |
| | LOWER-LIMIT VERSION INFORMATION |
| | PERIPHERAL DEVICE ID |

FIG.14

| PRODUCT ID | DOWNLOAD URL |
|---|---|
| 001 | https://www.abc.co.jp |
| 002 | https://www.def.co.jp |
| 003 | https://www.ghi.co.jp |
| ⋮ | ⋮ |

LICENSE CANNOT BE UPDATED.
PLEASE TRY AGAIN AFTER A WHILE.

OK

INFORMATION PROCESSING APPARATUS, COMPUTER-READABLE RECORDING MEDIUM, AND INFORMATION PROCESSING SYSTEM

CROSS-REFERENCE TO RELATED APPLICATIONS

The present application claims priority under 35 U.S.C. § 119 to Japanese Patent Application No. 2015-247852 filed Dec. 18, 2015. The contents of which are incorporated herein by reference in their entirety.

BACKGROUND OF THE INVENTION

1. Field of the Invention

The present invention relates to an information processing apparatus, a computer-readable recoding medium, and an information processing system.

2. Description of the Related Art

In recent years, due to the developments of communication devices, a mechanism being capable of selecting an application on a website and downloading and installing the selected application has been widespread. There has been a trend of introducing such a mechanism in image forming apparatuses, and there has been conceived and known a mechanism in which an application installed in an image forming apparatus with the mechanism described above inquires license information of the application itself to a license management server that manages license information (usage authorization information) related to usage authorization, and then changes its own behavior according to the license information notified from the license management server.

For example, Japanese Unexamined Patent Application Publication No. 2011-65296 discloses a configuration in which a platform (software for providing, to an application, an interface for using hardware resources of an MFP (Multifunction Peripheral)) of an MFP checks license information for each of applications held in the MFP, and when there is license information for which its expiratory date has already been reached, updating of the license information is requested to a license management server.

However, in Japanese Unexamined Patent Application Publication No. 2011-65296, there is no disclosure of a configuration in which an installed application checks its own license information without inquiring a license management server.

In view of the above problem, there is a need to provide an information processing apparatus, a computer-readable recording medium having a computer program, and an information processing system that enable an installed application to check its own license information without inquiring a license management server.

SUMMARY OF THE INVENTION

According to exemplary embodiments of the present invention, there is provided an information processing apparatus comprising: a correspondence-information storage unit configured to store therein correspondence information in which, with each piece of application identification information for identifying installed applications, usage authorization information related to usage authorization of the applications is associated; a specifying unit configured to, when a first request including the application identification information and requesting the usage authorization information is received from any of the applications, specify the usage authorization information associated with the application identification information included in the first request based on the correspondence information; and a notifying unit configured to notify the application of a requesting source of the first request of the usage authorization information specified by the specifying unit.

Exemplary embodiments of the present invention also provide a non-transitory computer-readable recording medium that contains a computer program causing a computer to execute: upon reception of, from an installed application, a first request including application identification information for identifying the application and requesting usage authorization information related to a usage authorization of the application, specifying the usage authorization information associated with the application identification information included in the first request, based on correspondence information stored in a correspondence-information storage unit that stores therein the correspondence information in which the usage authorization information is associated with each piece of the application identification information; and notifying the application of a requesting source of the first request of the usage authorization information specified at the specifying.

Exemplary embodiments of the present invention also provide an information processing system comprising: an information processing apparatus; and a server that is communicable with the information processing apparatus through a network, wherein the server includes a license-file storage unit configured to store therein one or more license files including usage authorization information indicating information related to a usage authorization of an application and usage authorization authentication information for authenticating the usage authorization, a first reception unit configured to receive a license file request including the usage authorization authentication information and requesting the license file corresponding to the usage authorization authentication information from the information processing apparatus, and a first transmission unit configured to transmit the license file corresponding to the usage authorization authentication information included in the license file request received by the first reception unit to the information processing apparatus, and wherein the information processing apparatus includes a second transmission unit configured to transmit the license file request including the usage authorization authentication information corresponding to an installed application to the server, a second reception unit configured to receive the license file from the server as a response to the license file request, a correspondence-information storage unit configured to store therein correspondence information in which application identification information for identifying an installed application and the usage authorization information included in the license file that is received by the second reception unit are associated with each other, a specifying unit configured to specify, when a first request including the application identification information and requesting the usage authorization information is received from any of the applications, the usage authorization information associated with the application identification information included in the first request based on the correspondence information, and a notifying unit configured to notify the application of a requesting source of the first request of the usage authorization information specified by the specifying unit.

BRIEF DESCRIPTION OF THE DRAWINGS

FIG. 6 is a diagram illustrating an example of an application list screen;

FIG. 7 is a diagram illustrating an example of an installation command;

FIG. 13 is a diagram illustrating an example of condition information;

FIG. 14 is a diagram illustrating an example of URL information;

FIG. 25 is a diagram illustrating an example of an error screen;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
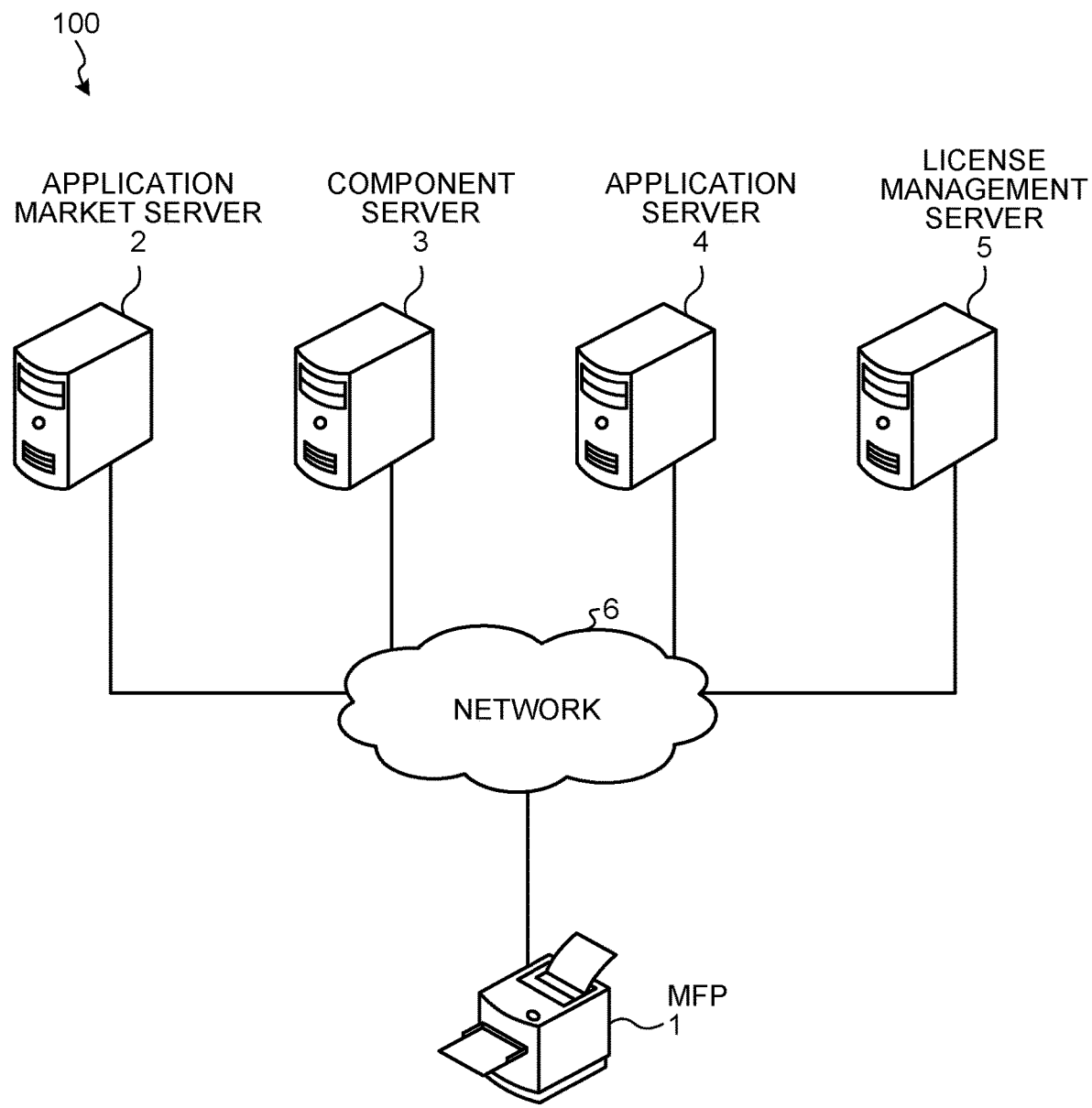
FIG. 1 is a diagram illustrating an example of a configuration of an information processing system according to an embodiment of the present invention.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Embodiments of an information processing apparatus, a computer-readable recording medium having a computer program, and an information processing system according to the present invention will be described below in detail with reference to the accompanying drawings. In the following descriptions, as an example of the information processing apparatus according to the present invention, an MFP as a mode of an image forming apparatus is described; however, the information processing apparatus is not limited thereto. The MFP is an apparatus having a plurality of different functions such as a copier function, a scanner function, a printer function, and a facsimile function.

FIG. 1 is a diagram illustrating an example of a configuration of an information processing system 100 according to an embodiment of the present invention. As illustrated in FIG. 1, the information processing system 100 includes an MFP 1, an application market server 2, a component server 3, an application server 4, and a license management server 5, and these elements can be connected to one another via a network 6 such as the Internet.

The application market server 2 transmits a webpage for displaying a list of one or more applications upon request from the MFP 1 and for downloading the terms of use of respective applications, in other words, a webpage for providing applications (in the following descriptions, the webpage is sometimes referred to as "application list screen"), to the MFP 1. In this example, an application for acquiring an application list screen from the application market server 2 to display the screen (the application is sometimes referred to as "application-market application") is installed in advance in the MFP 1. In this example, functions of the application-market application are implemented by using an application for providing functions of a web browser (this application is sometimes referred to as "browser application"). In this example, the browser application is also installed in the MFP 1 in advance. Specific contents of the MFP 1 are described later.

The component server 3 determines whether the MFP 1 satisfies conditions for using an application selected from the application list screen, and when the conditions are satisfied, the component server 3 transmits a URL (hereinafter, sometimes referred to as "download URL") indicating the location of the application server 4 managing the application to the MFP 1. The MFP 1 can specify the download URL received from the component server 3, access the application server 4, download the application selected from the application list screen, and install therein the downloaded application.

The license management server 5 is an example of "server", and manages one or more license files including license information that is an example of "usage authorization information" related to the usage authorization of an application and a product key (a license key) that is an example of "usage authorization authentication information" for authenticating the usage authorization. In this example, the application is registered in the license management server 5 as a licensed item, and the product key is an identifier that is issued by the license management server 5 uniquely for each licensed item. The product key is used as information (a license identifier) for identifying usage authorization (a license) of an application as a licensed item, or as information for proving that the corresponding user is a legitimate purchaser of the licensed item (proving that the user has a regular license).

Upon reception of a license file request including a product key and requesting a license file corresponding to the product key from the MFP 1 (a function of "first reception unit"), the license management server 5 transmits a license file corresponding to the product key included in the license file request to the MFP 1 (a function of "first transmission unit"). Subsequently, the license management server 5 records therein a state where the corresponding product key has been activated (verified) in the MFP 1 having transmitted the license file. The MFP 1 can be identified by, for example, a serial number. In the MFP 1, when a license file is received as a response to the license file request, it means to be a proof that the corresponding user has a regular license of an application corresponding to the product key included in the license file (it means that the application is activated), and thus the application can be used. Meanwhile, when the license file is returned, the application is in a deactivated state (a state where the corresponding user does not have a regular license), and thus the corresponding application cannot be used.

Figure 2:
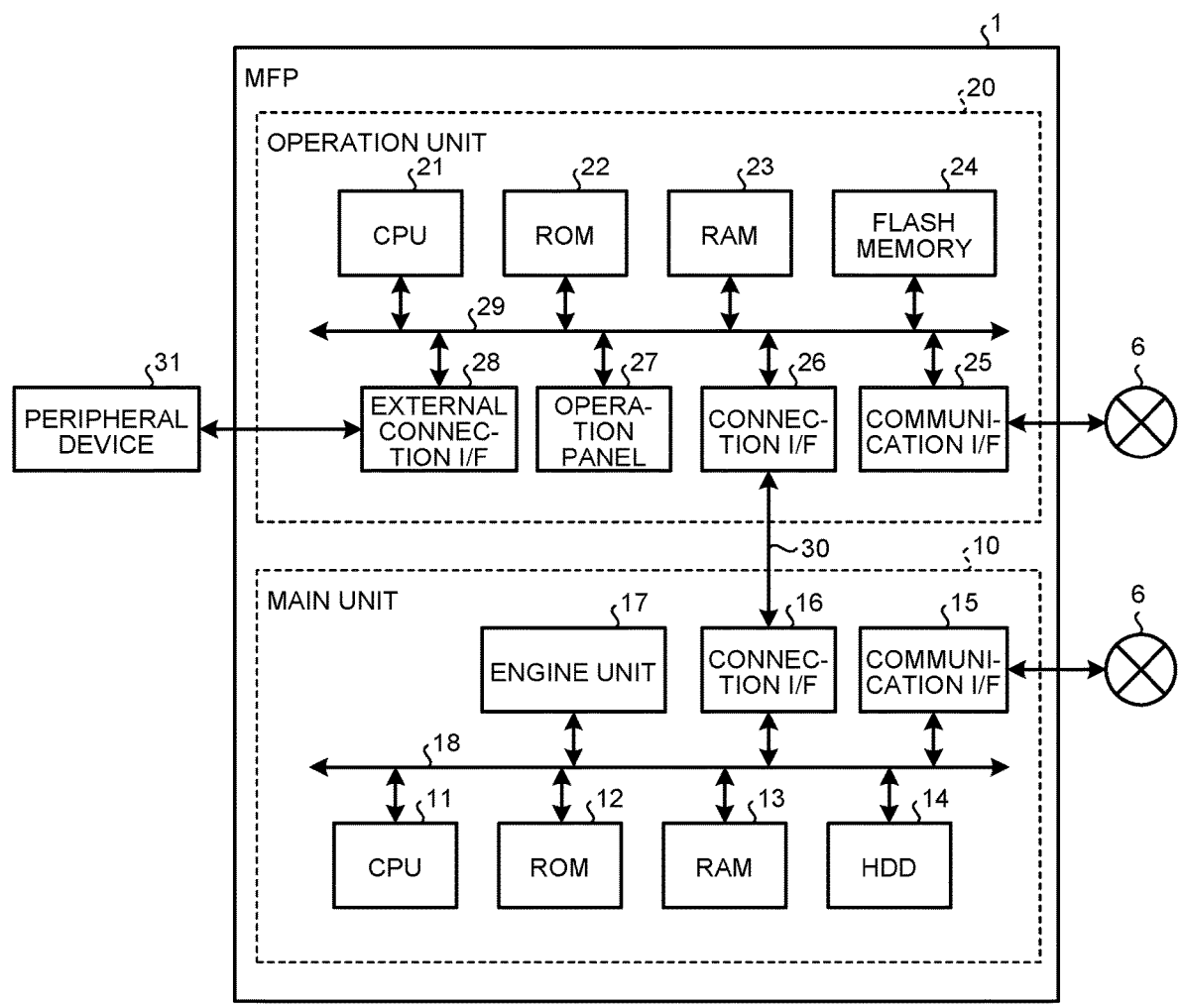
FIG. 2 is a diagram illustrating an example of a hardware configuration of an MFP included in the information processing system.

Next, a hardware configuration of the MFP 1 is described with reference to FIG. 2. As illustrated in FIG. 2, the MFP 1 includes a main unit 10 that can implement various functions such as a copier function, a scanner function, a facsimile function, and a printer function, and an operation unit 20 that receives user operations. Receiving user operations is a concept including receiving information (including, for example, a signal indicating a coordinate value of a screen) input according to user operations. The main unit 10 and the operation unit 20 are connected to each other in a mutually communicable manner via an exclusive communication path 30. As the communication path 30, for example, while a communication path complying with the USB (Universal Serial Bus) standard can be used, it can be another type of communication path complying with an arbitrary standard regardless of whether it is wireless or wired.

Furthermore, one or more peripheral devices 31 can be connected to the MFP 1. As the peripheral device 31, an image processing apparatus such as a printer or a camera, an audio input/output device such as a microphone or a speaker, and a card reader/writer are assumed. The connection between the MFP 1 and the peripheral device 31 can be a mode of physically wired connection, or can be a mode of wireless connection such as near field communication (NFC).

The main unit 10 can be operated according to an operation received by the operation unit 20. The main unit 10 is also communicable with external devices such as a client PC (Personal Computer), and can be operated according to an instruction received from external devices.

First, a hardware configuration of the main unit 10 is described. As illustrated in FIG. 2, the main unit 10 includes a CPU 11, a ROM 12, a RAM 13, an HDD (hard disk drive) 14, a communication I/F (interface) 15, a connection I/F 16, and an engine unit 17, and these elements are connected to one another via a system bus 18.

The CPU 11 comprehensively controls operations of the main unit 10. By executing a program stored in the ROM 12 or the HDD 14 and the like while having the RAM 13 as a work area, the CPU 11 executes controls the operations of the main unit 10 on the whole, and implements various functions mentioned above, such as the copier function, the scanner function, the facsimile function, the printer function, and the like.

The communication I/F 15 is an interface for connecting the main unit 10 to the network 6. The connection I/F 16 is an interface for performing communication between the main unit 10 and the operation unit 20 via the communication path 30.

The engine unit 17 is hardware for performing processes other than general-purpose information processing and communication, in order to implement the copier function, the scanner function, the facsimile function, and the printer function. For example, the engine unit 17 includes elements such as a scanner (an image reading unit) that scans and reads an image on a document, a plotter (an image forming unit) that performs printing on a sheet material such as a paper sheet, and a facsimile unit that performs facsimile communication. Further, the engine unit 17 can also include specific optional devices such as a finisher that sorts printed sheet materials and an ADF (Automatic Document Feeder) that automatically feeds documents.

Next, a hardware configuration of the operation unit 20 is described. As illustrated in FIG. 2, the operation unit 20 includes a CPU 21, a ROM 22, a RAM 23, a flash memory 24, a communication I/F 25, a connection I/F 26, an operation panel 27, and an external connection I/F 28, and these elements are connected to one another via a system bus 29.

The CPU 21 comprehensively controls operations of the operation unit 20. The CPU 21 executes a program stored in the ROM 22 or the flash memory 24 and the like while having the RAM 23 as a work area in order to control the operations of the operation unit 20 on the whole, and to implement various functions described later, such as displaying of information (images) corresponding to an input received from a user.

The communication I/F 25 is an interface for connecting the operation unit 20 and the network 6. The connection I/F 26 is an interface for communication between the operation unit 20 and the main unit 10 via the communication path 30.

The operation panel 27 receives various types of inputs according to operations of a user, and displays various types of information (such as information according to a received operation, information indicating an operation status of the MFP 1, information indicating a setting state and the like). In this example, the operation panel 27 is constituted by a liquid crystal display (LCD) having a touch panel function incorporated therein; however, the operation panel 27 is not limited thereto. For example, the operation panel 27 can be constituted by an organic EL display device having a touch panel function incorporated therein. In addition to or instead of the touch panel function, another operation unit such as a hardware key and a display unit such as a lamp can be provided.

The external connection I/F 28 is an interface for connecting the operation unit 20 to the peripheral device 31, and is an interface for connecting the operation unit 20 to, for example, an image processing apparatus such as a camera, an audio input/output device such as a microphone or a speaker, and hardware such as a card reader/writer.

Figure 3:
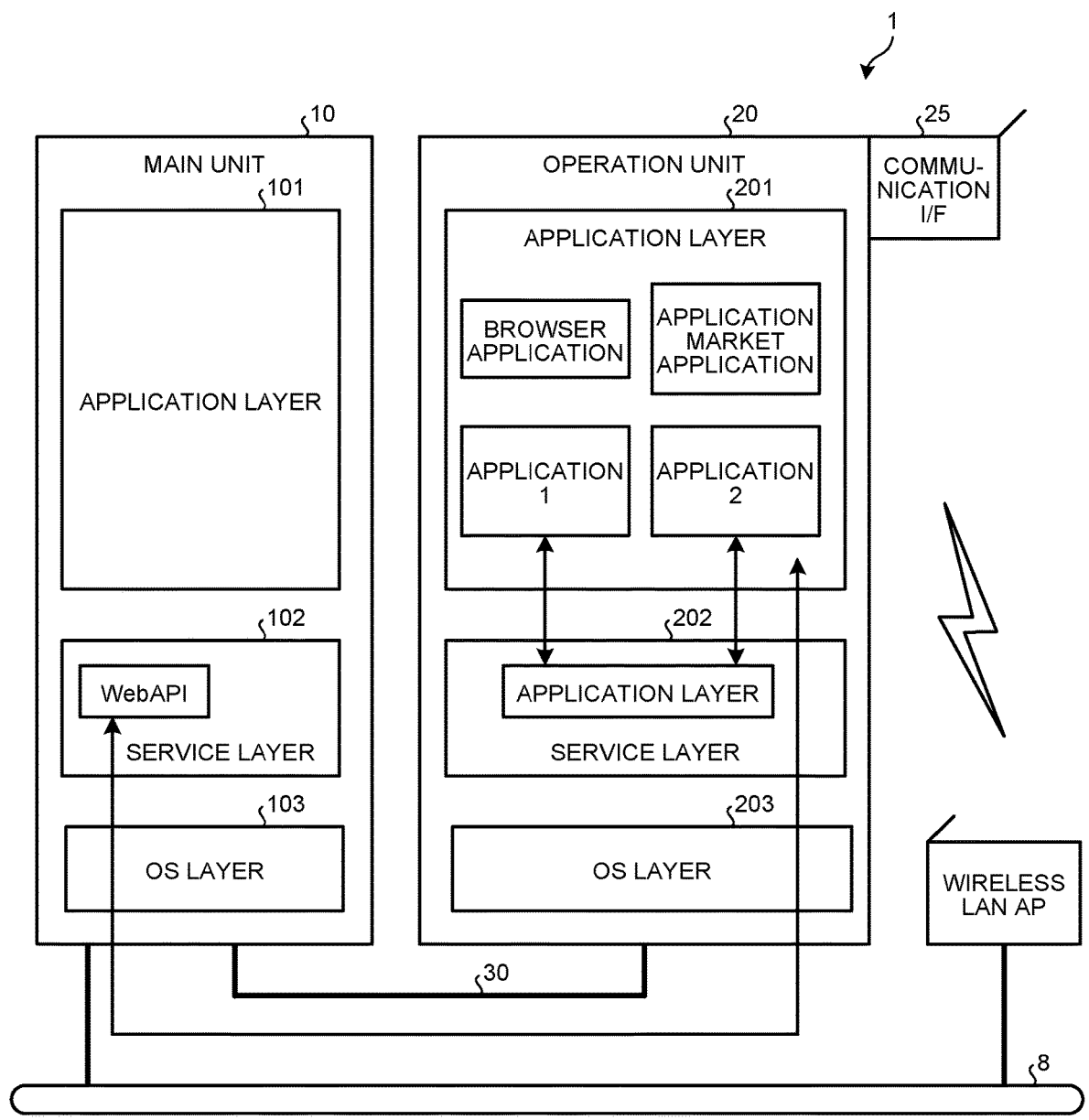
FIG. 3 is a diagram illustrating an example of a software configuration of the MFP.

Next, a software configuration of the MFP 1 is described. FIG. 3 is a schematic diagram illustrating an example of the software configuration of the MFP 1. As illustrated in FIG. 3, the main unit 10 includes an application layer 101, a service layer 102, and an OS layer 103. The entities of the application layer 101, the service layer 102, and the OS layer 103 are various types of software stored in the ROM 12, the HDD 14, and the like. Various types of functions are provided as the CPU 11 executes these pieces of software.

The software of the application layer 101 is application software for operating hardware resources to provide predetermined functions (in the following descriptions, the application software is sometimes referred to as "application"). Examples of the application include a copier application for providing a copier function, a scanner application for providing a scanner function, a facsimile application for providing a facsimile function, and a printer application for providing a printer function.

The software of the service layer 102 is software that is interposed between the application layer 101 and the OS layer 103 and for providing an interface for using hardware resources included in the main unit 10 to an application. More specifically, the software of the service layer 102 is software for providing a function of receiving an operation request with regard to hardware resources to arbitrate the operation request. Examples of the operation request to be received in the service layer 102 include a request for reading with a scanner and a request for printing and the like with a plotter.

The interface function realized by the service layer 102 is provided not only to the application layer 101 of the main unit 10 but also to an application layer 201 of the operation unit 20. That is, the application layer 201 (the application) of the operation unit 20 can also realize functions using the hardware resources (such as the engine unit 17) of the main unit 10 through the interface function of the service layer 102. For example, the interface function of the service layer 102 is provided with a Web API. The operation unit 20 and the main unit 10 can communicate with each other by using the communication path 30 as a network.

The software of the OS layer 103 is basic software (an operating system (OS)) for providing basic functions to control hardware included in the main unit 10. The software of the service layer 102 converts a usage request of hardware resources from various types of applications into a command that can be interpreted by the OS layer 103, and sends the command to the OS layer 103. Subsequently, upon execution of the command with the software of the OS layer 103, the hardware resources perform operations according to requests from the applications. The software of each of the service layer 102 and the OS layer 103 can be regarded as system software (that is different from applications) for supporting operations and usage itself of a computer, such as managing and controlling hardware of the computer.

Similarly, the operation unit 20 includes the application layer 201, a service layer 202, and an OS layer 203. As for the application layer 201, the service layer 202, and the OS layer 203 included in the operation unit 20, the hierarchical structures thereof are identical to those on the side of the main unit 10. However, the types of functions provided by the application of the application layer 201 and of operation requests that can be received in the service layer 202 are different from those on the side of the main unit 10. While the application of the application layer 201 can be software for operating the hardware resources included in the operation unit 20 to provide a predetermined function, the application is mainly software for providing functions of a UI (User Interface) used for performing operations and displaying related to the functions (the copier function, the scanner function, the facsimile function, and the printer function) included in the main unit 10 and functions for updating a license file of an installed application.

In the present embodiment, the software of the application layer 201 includes a browser application and an application-market application. Further, the software of the service layer 202 is software for receiving a request (an inquiry or the like described later) from the application of the application layer 201 and providing a function of performing a process according to the received request. In the present embodiment, the software of the service layer 202 includes various types of software such as software for providing functions of a control unit 114 described later (this software is referred to as "installer"). In this example, an installed application (an application 1 and an application 2 in the example of FIG. 3) can make an inquiry described later to the installer.

In the present embodiment, in order to maintain the independence of respective functions, the software of the OS layer 103 on the side of the main unit 10 and the software of the OS layer 203 on the side of the operation unit 20 are different from each other. That is, the main unit 10 and the operation unit 20 are operated independently from each other in respectively different operating systems. For example, it is possible that Linux (trademark) is used as the software of the OS layer 103 on the side of the main unit 10 and that Android (trademark) is used as the software of the OS layer 203 on the side of the operation unit 20.

As described above, in the MFP 1 according to the present embodiment, the main unit 10 and the operation unit 20 are operated in respectively different operating systems, and thus communication between the main unit 10 and the operation unit 20 is performed as communication between different devices, not as inter-process communication within the same device. An operation of transmitting information (contents of instructions from a user) received by the operation unit 20 to the main unit 10 (command communication) and an operation of notifying an event from the main unit 10 to the operation unit 20 correspond to the communication between the main unit 10 and the operation unit 20. In this example, as the operation unit 20 performs the command communication to the main unit 10, the functions of the main unit 10 can be used. Further, examples of the event to be notified from the main unit 10 to the operation unit 20 include execution statuses of operations of the main unit 10 and contents set at the side of the main unit 10.

Furthermore, in the present embodiment, because power supply to the operation unit 20 is performed from the main unit 10 through the communication path 30, power supply control of the operation unit 20 can be performed separately (independently) from power supply control of the main unit 10.

Figure 4:
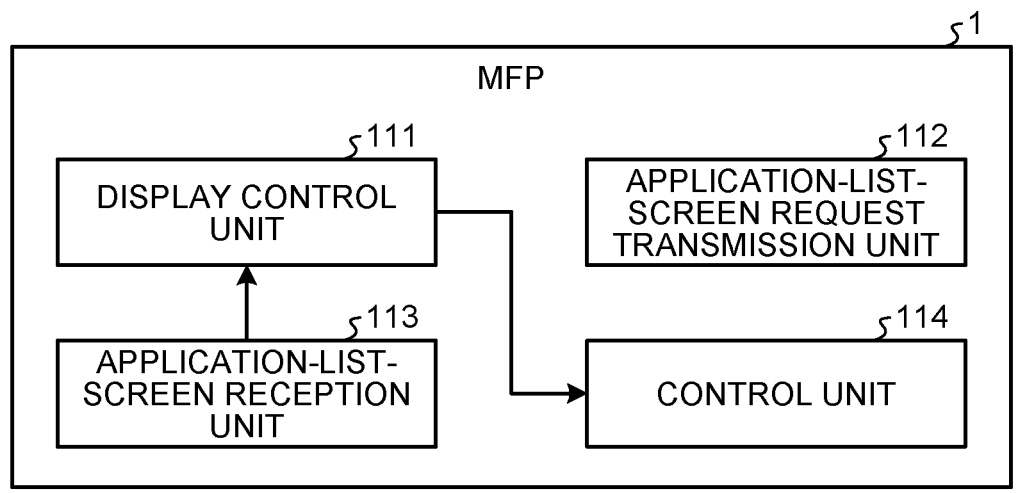
FIG. 4 is a diagram illustrating an example of functions included in the MFP.

Next, functions included in the MFP 1 are described. FIG. 4 is a diagram illustrating an example of functions included in the MFP 1. As illustrated in FIG. 4, the MFP 1 includes a display control unit 111, an application-list-screen request transmission unit 112, an application-list-screen reception unit 113, and the control unit 114. For convenience of explanation, functions related to the present embodiment are mainly exemplified in FIG. 4; however, the functions included in the MFP 1 are not limited thereto.

Figure 5:
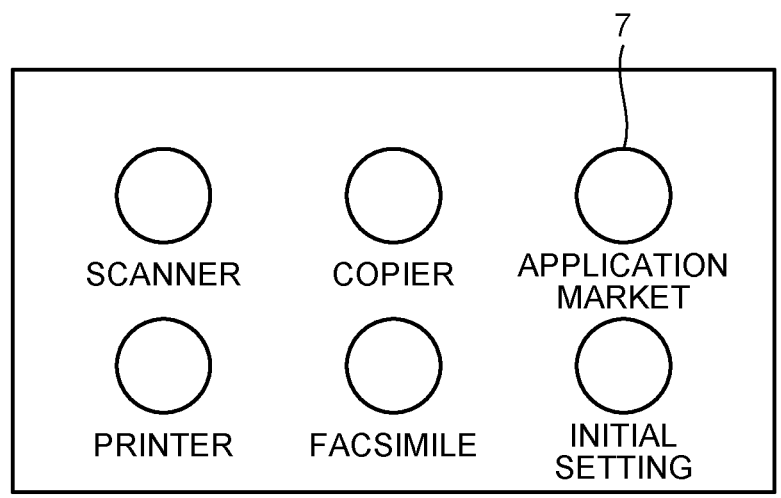
FIG. 5 is a diagram illustrating an example of an operation screen.

The display control unit 111 executes control of displaying various types of screens on an operation panel (a display unit). The display control unit 111 according to the present embodiment executes control of displaying an operation screen for performing various types of operations on the operation panel 27. FIG. 5 is a diagram illustrating an example of an operation screen, and icons 7 for activating an application-market application are displayed on the operation screen. The display control unit 111 according to the present embodiment also executes control of displaying an application list screen on the operation panel 27.

The application-list-screen request transmission unit 112 transmits an application list screen request for requesting an application list screen to the application-market server 2. The application-list-screen reception unit 113 receives an application list screen from the application market server 2. Subsequently, the display control unit 111 executes control of displaying the application list screen received from the application-list-screen reception unit 113 on the operation panel 27.

In the present embodiment, when a user touches any one of the icons 7, an application-market application is activated, and the application-market application uses a browser application to transmit an application list screen request to the application market server 2. Subsequently, the application-market application uses the browser application to display the application list screen received from the application market server 2 as a response to the application list screen request.

FIG. 6 is a diagram illustrating an example of an application list screen. In the example of FIG. 6, on the application list screen, as for each of a plurality of applications, explanatory information for explaining the contents of a corresponding application and a button 8 for instructing installation of the corresponding application (in this example, the button 8 for instructing installation of an application. This button 8 is hereinafter referred to as "installation button 8"). In this example, a command on an installer to install an application (this command is hereinafter referred to as "installation command") is attached on the installation button 8 corresponding to the application in a format of a URI (the format can be URL, for example). In this example, pressing the installation button 8 means selecting the installation command attached on the corresponding installation button 8 (it can be regarded as selecting an application a user wishes to install).

FIG. 7 is a diagram illustrating an example of an installation command attached to the installation button 8 corresponding to an application identified by a product ID (an application ID) as "49354", where the installation command is a command for installing an application that is identified by the product ID as "49354". For example, when a user presses the installation button 8 of any one of applications displayed on the application list screen, the browser application notifies the OS of the operation unit 20 of the installation command attached to the installation button 8. The OS of the operation unit 20 checks the notified installation command and broadcasts the installation command to each piece of software (an application or system software) being operated on the operation unit 20. Subsequently, an installer that provides the functions of the control unit 114 described later reacts to the broadcasted installation command.

The explanation of FIG. 4 is continued here. The control unit 114 executes control (including control of installing an application) of using, by the MFP 1, an application selected by a user from the applications displayed on the application list screen. Detailed functions of the control unit 114 are described later.

The functions included in the MFP 1 as described above (the display control unit 111, the application-list-screen request transmission unit 112, the application-list-screen reception unit 113, and the control unit 114) are implemented as the CPU (11 or 21) executes a program stored in a storage device (such as the ROM 12, the HDD 14, the ROM 22, and the flash memory 24); however, the execution of the program is not limited thereto, and for example, it is also possible that at least a part of the functions included in the MFP 1 as described above is implemented by an exclusive hardware circuit (such as a semiconductor integrated circuit).

Figure 8:
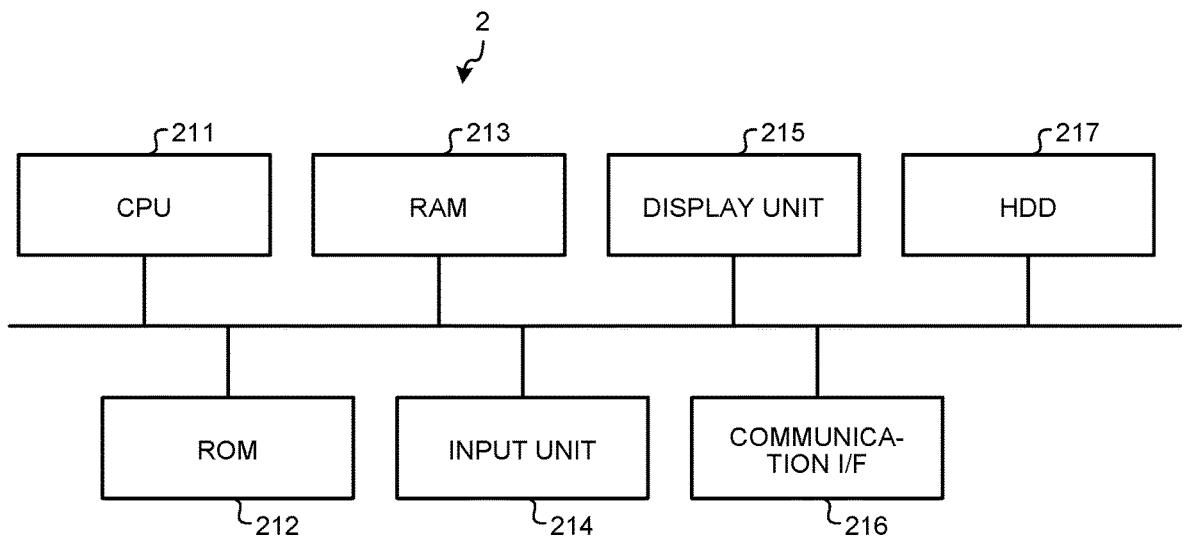
FIG. 8 is a diagram illustrating an example of a hardware configuration of an application market server included in the information processing system.

Next, a configuration of the application market server 2 is described. FIG. 8 is a diagram illustrating an example of a hardware configuration of the application market server 2. It is assumed that the hardware configuration of the component server 3, the application server 4, and the license management server 5 described later is also identical to the configuration illustrated in FIG. 8. As illustrated in FIG. 8, the application market server 2 includes a CPU 211, a ROM 212, a RAM 213, an input unit 214, a display unit 215, a communication I/F 216, and an HDD 217. The CPU 211 comprehensively controls operations of the application market server 2. The ROM 212 is a nonvolatile memory that stores therein various types of data such as a program. The RAM 213 is a volatile memory that functions as a work area for various types of processes performed by the CPU 211. The input unit 214 is a device used for operational inputs made by a user, and is constituted by a mouse or a keyboard, for example. The display unit 215 is a device for displaying various types of information, and is constituted by a liquid crystal display device, for example. The communication I/F 216 is an interface for connecting the application market server 2 to the network 6. The HDD 217 is a memory that functions as an auxiliary storage device.

Figure 9:
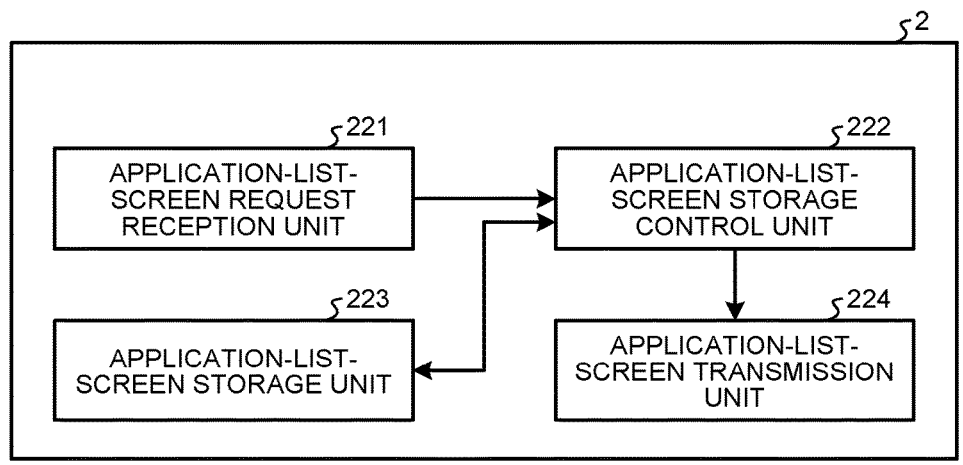
FIG. 9 is a diagram illustrating an example of functions included in the application market server.

FIG. 9 is a diagram illustrating an example of functions included in the application market server 2. As illustrated in FIG. 9, the application market server 2 includes an application-list-screen request reception unit 221, an application-list-screen storage control unit 222, an application-list-screen storage unit 223, and an application-list-screen transmission unit 224. For convenience of explanation, functions related to the present embodiment are mainly exemplified in FIG. 9; however, the functions included in the application market server 2 are not limited thereto.

The application-list-screen request reception unit 221 receives an application list screen request from the MFP 1. The application-list-screen storage control unit 222 controls reading and writing of data from and to the application-list-screen storage unit 223. When an application list screen is received by the application-list-screen request reception unit 221, the application-list-screen storage control unit 222 reads the application list screen stored in the application-list-screen storage unit 223, and sends the read application list screen to the application-list-screen transmission unit 224.

Subsequently, the application-list-screen transmission unit 224 transmits the application list screen as a response to the application list screen request to the MFP 1.

The functions included in the application market server 2 as described above (the application-list-screen request reception unit 221, the application-list-screen storage control unit 222, and the application-list-screen transmission unit 224) are implemented as the CPU 211 executes a program stored in a storage device (such as the ROM 212 and the HDD 217); however, the execution of the program is not limited thereto, and for example, it is also possible that at least a part of the functions included in the application market server 2 is implemented by an exclusive hardware circuit (such as a semiconductor integrated circuit). Further, the application-list-screen storage unit 223 can be realized by, for example, the HDD 217.

Figure 10:
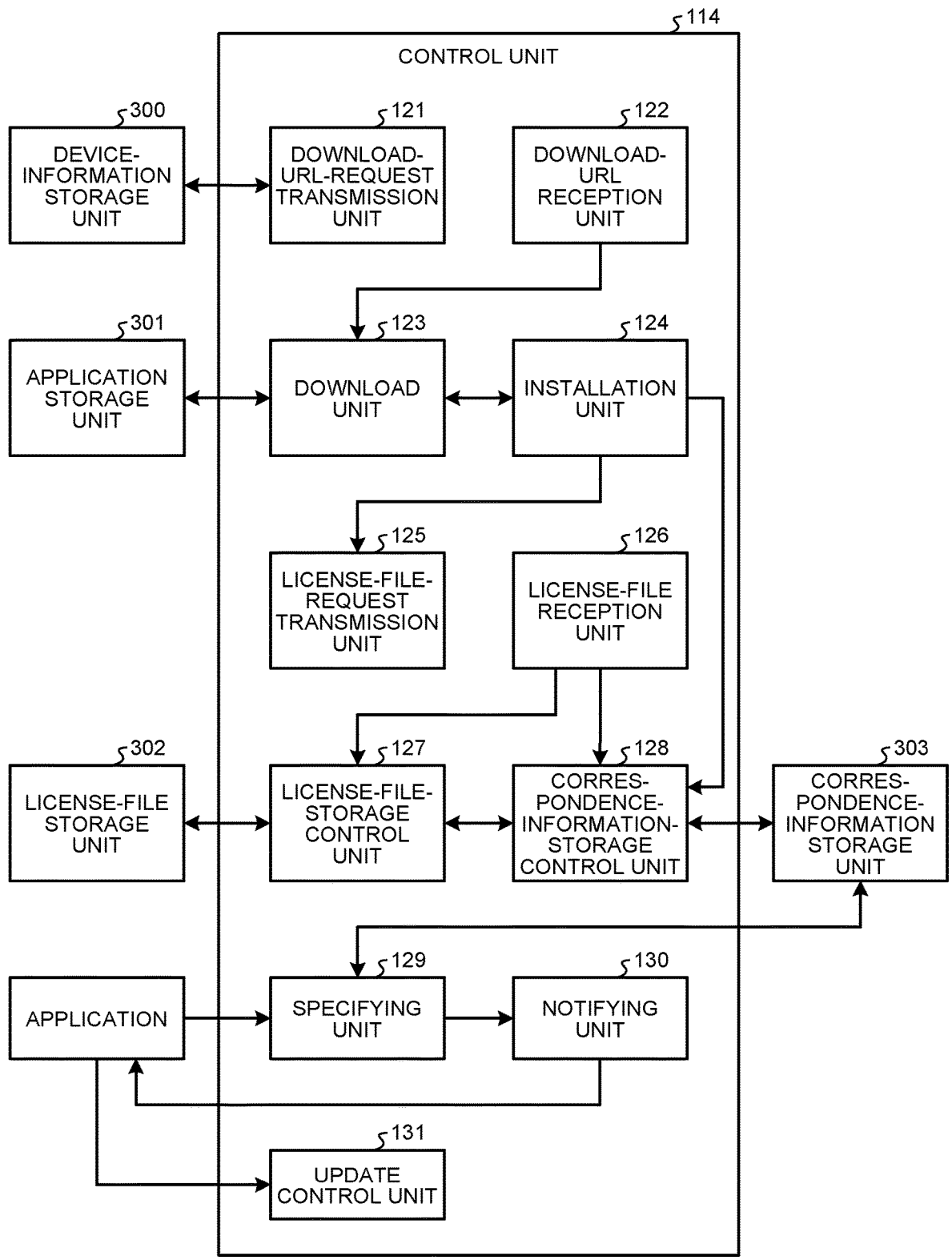
FIG. 10 is a diagram illustrating an example of detailed functions of a control unit included in the MFP.

Next, detailed functions of the control unit 114 included in the MFP 1 are described. FIG. 10 is a diagram illustrating an example of the detailed functions of the control unit 114. As illustrated in FIG. 10, the control unit 114 includes a download-URL-request transmission unit 121, a download-URL reception unit 122, a download unit 123, an installation unit 124, a license-file-request transmission unit 125, a license-file reception unit 126, a license-file-storage control unit 127, a correspondence-information-storage control unit 128, a specifying unit 129, a notifying unit 130, and an update control unit 131.

The download-URL-request transmission unit 121 includes a product ID that identifies an application selected from the application list screen and device information stored in a device-information storage unit 300, and transmits a download-URL request indicating information for requesting a download URL indicating the location of the application server 4 that manages the application identified by the product ID to the component server 3.

Figure 11:
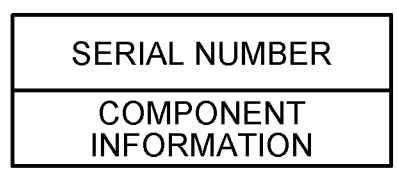
FIG. 11 is a diagram illustrating an example of a data structure of device information.

FIG. 11 is a conceptual diagram representing an example of a data structure of device information stored in the device-information storage unit 300. In the example of FIG. 11, the device information includes at least a serial number uniquely identifies the MFP 1 and component information indicating a component (representing a unit for providing a predetermined function) already introduced in the MFP 1. For example, the component information can be constituted by information in which information (such as a product ID) for identifying software already introduced in the MFP 1, information for indicating the version of the software, and peripheral-device connection information indicating existence of connection to the peripheral devices 31 that are required for providing the functions of the software. Further, destination information indicating the country or region where the MFP 1 is used can be included in the device information. For example, the device-information storage unit 300 can be realized by, for example, the HDD 14, the flash memory 24, and the like included in the MFP 1.

The explanation of FIG. 10 is continued here. The download-URL reception unit 122 receives a download URL from the component server 3 as a response to a download URL request.

Figure 12:
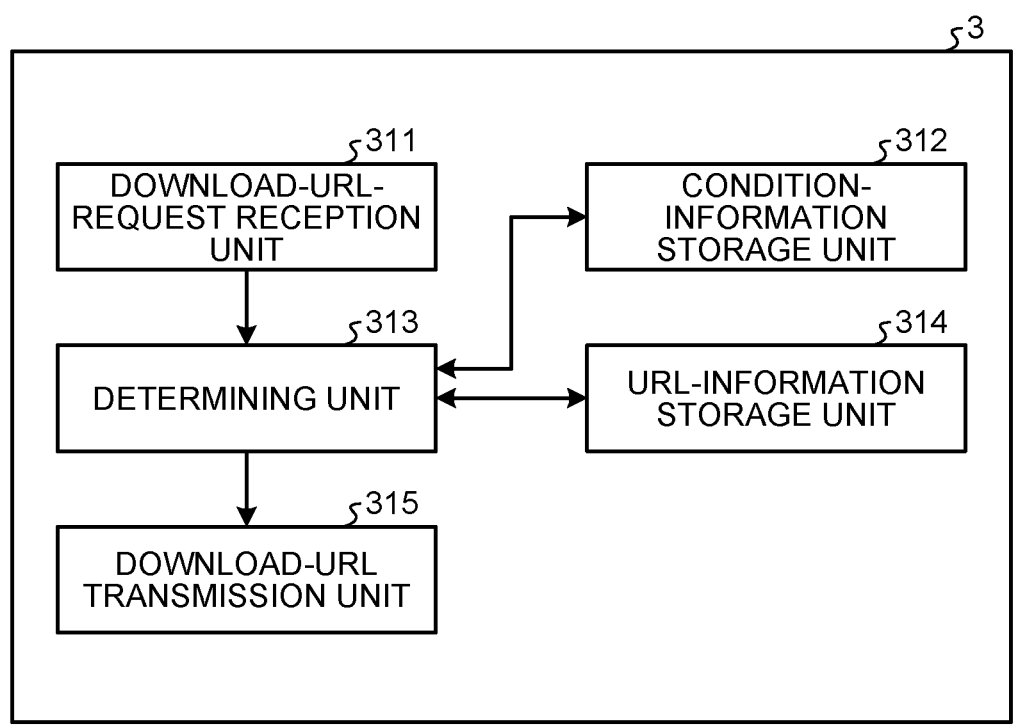
FIG. 12 is a diagram illustrating an example of functions included in a component server included in the information processing system.

Functions included in the component server 3 are described here. FIG. 12 is a diagram illustrating an example of functions included in the component server 3. As illustrated in FIG. 12, the component server 3 includes a download-URL-request reception unit 311, a condition-information storage unit 312, a determining unit 313, a URL-information storage unit 314, and a download-URL transmission unit 315.

The download-URL-request reception unit 311 receives the download URL request described above from the MFP 1.

The condition-information storage unit 312 stores therein a plurality of pieces of condition information that correspond to a plurality of applications on a one-to-one basis. Each of the pieces of condition information includes a product ID for identifying a corresponding application, version information of the corresponding application, and dependency component information indicating necessary conditions for using the corresponding application. In the example of FIG. 13, the dependency component information includes a product ID or a module ID for identifying software (an application or a system software) required for using the corresponding application, lower-limit version information of a component required for using the corresponding application (in other words, a component in a dependency relation to the corresponding application), and a peripheral device ID for identifying the peripheral devices 31 required for using the corresponding application.

The explanation of FIG. 12 is continued here. The determining unit 313 selects condition information corresponding to a product ID included in a download URL request received from the download-URL-request reception unit 311, from a plurality of pieces of condition information stored in the condition-information storage unit 312. Subsequently, by comparing device information included in the download URL request and the selected condition information, the availability of usage of the application identified by the product ID included in the download URL request is determined. When it is determined that the application can be used, the determining unit 313 specifies a download URL corresponding to the product ID included in the download URL request based on the URL information stored in the URL-information storage unit 314, and sends the specified download URL to the download-URL transmission unit 315.

FIG. 14 is a diagram illustrating an example of URL information stored in the URL-information storage unit 314. The URL information is information in which, with a plurality of product IDs, a download URL indicating the location of the application server 4 that manages applications identified by the product IDs is associated.

The explanation of FIG. 12 is continued here. The download-URL transmission unit 315 transmits the download URL sent from the determining unit 313 as a response to a download URL request.

The functions included in the component server 3 as described above (the download-URL-request reception unit 311, the determining unit 313, the download-URL transmission unit 315) are implemented as the CPU 211 executes a program stored in a storage device (such as the ROM 212 and the HDD 217); however, the execution of the program is not limited thereto, and for example, it is also possible that at least a part of the functions included in the component server 3 is implemented by an exclusive hardware circuit (such as a semiconductor integrated circuit). Further, the condition-information storage unit 312 and the URL-information storage unit 314 described above can be realized by, for example, the HDD 217. The configuration of the component server 3 is as described above.

Referring back to FIG. 10, the explanation of detailed functions of the control unit 114 included in the MFP 1 is continued. The download unit 123 transmits a download request including a product ID of an application selected from an application list screen and requesting downloading of the application to the application server 4 that corresponds to a download URL received by the download-URL reception unit 122. Subsequently, as a response to the download request, the download unit 123 receives (downloads) the application from the application server 4. The download unit 123 then stores the received application in an application storage unit 301. The application storage unit 301 can be realized by, for example, the HDD 14, the flash memory 24, and the like included in the MFP 1.

Figure 15:
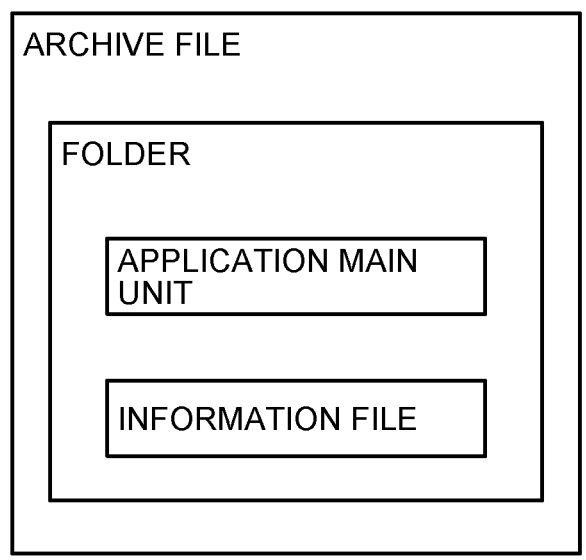
FIG. 15 is a diagram illustrating an example of a data structure of an application.

In this example, the application downloaded from the application server 4 is provided as an archive file as illustrated in FIG. 15, and the application is constituted by an application main unit and an information file liked to the application main unit. A product ID or version information corresponding to the application main unit, information related to conditions required for operating the application main unit, and the like are described in the information file.

The information file can have a mode in which the condition information described above corresponding to the application main unit is described therein.

Figure 16:
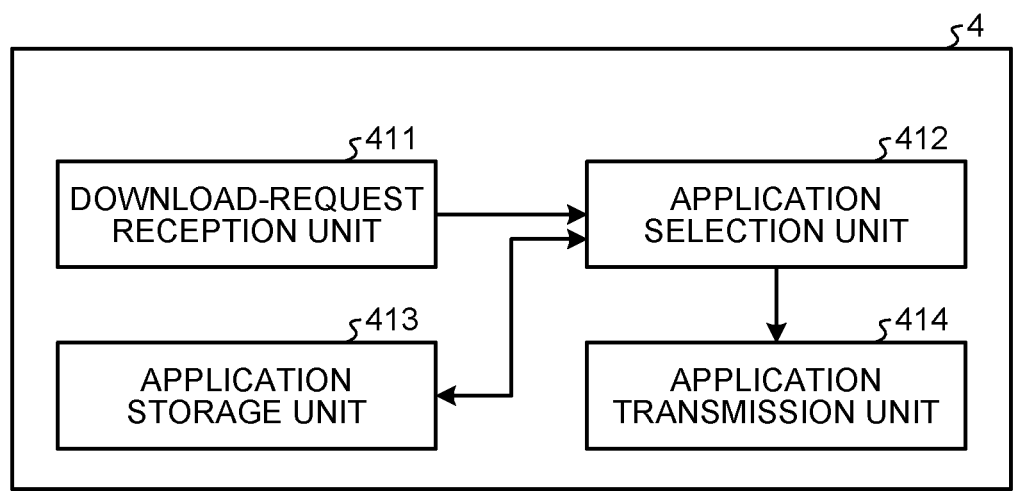
FIG. 16 is a diagram illustrating an example of functions included in an application server.

Functions included in the application server 4 are described here. FIG. 16 is a diagram illustrating an example of functions included in the application server 4. As illustrated in FIG. 16, the application server 4 includes a download-request reception unit 411, an application selection unit 412, an application storage unit 413, and an application transmission unit 414.

The download-request reception unit 411 receives the download request described above from the MFP 1. The application selection unit 412 selects, from a plurality of applications stored in the application storage unit 413, an application corresponding to the product ID included in the download request received from the download-request reception unit 411. The application storage unit 413 stores therein a plurality of applications provided as an archive file as illustrated in FIG. 15.

The application transmission unit 414 transmits, as a response to the download request, an application selected by the application selection unit 412 to the MFP 1.

The functions included in the application server 4 (the download-request reception unit 411, the application selection unit 412, and the application transmission unit 414) are realized as the CPU 211 executes a program stored in a storage device (such as the ROM 212 and the HDD 217); however, the execution of the program is not limited thereto, and for example, it is also possible that at least a part of the functions included in the application server 4 is realized by an exclusive hardware circuit (such as a semiconductor integrated circuit). Further, the application storage unit 413 described above can be realized by, for example, the HDD 217.

Referring back to FIG. 10, the explanation of detailed functions of the control unit 114 included in the MFP 1 is continued. The installation unit 124 installs an application downloaded by the download unit 123 in the MFP 1. In the present embodiment, the installation unit 124 instructs the correspondence-information-storage control unit 128 to record information (in this example, application management information described later) required for managing an installation target application in correspondence information described later. The correspondence-information-storage control unit 128 having received this instruction records the application management information required for managing the application in the correspondence information described later. Specific contents of the correspondence information are described later.

When installation of an application by the installation unit 124 is completed (succeeded), the license-file-request transmission unit 125 (second transmission unit) transmits a license file request for requesting a license file including a product key corresponding to the installed application to the license management server 5.

Figure 17:
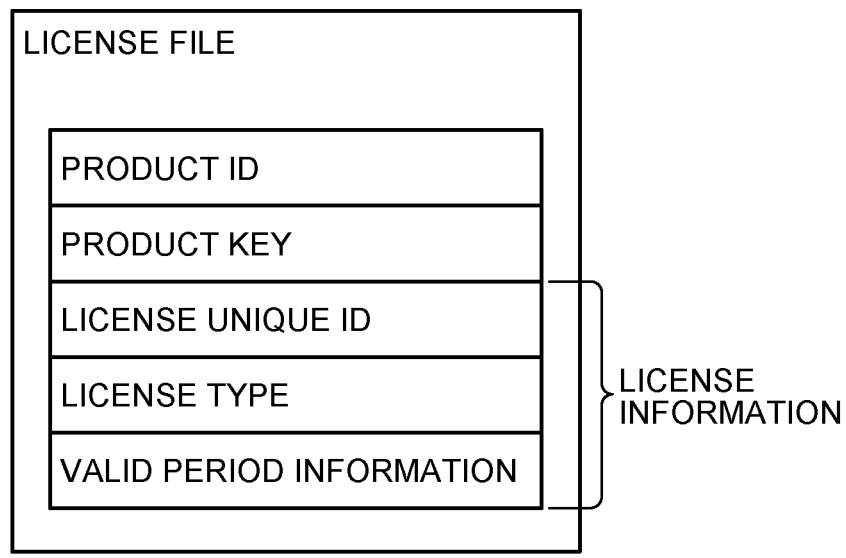
FIG. 17 is a diagram illustrating an example of a license file.

The license-file reception unit 126 (second reception unit) receives a license file from the license management server 5 as a response to the license file request. FIG. 17 is a diagram illustrating an example of a license file. In the example of FIG. 17, the license file includes a product ID, a product key, a license unique ID, a license type, and valid period information.

The product ID is information for identifying an application to which a license is given (usage of the application is permitted) by a license file including the product ID. The product key is information used for authenticating the license. The license unique ID is information for uniquely identifying the license.

The license type is information indicating the type of license. Examples of the license type include a regular license and a trial license. The regular license is a license indicating the usage authorization of a user who has purchased an application, and the trial license is a license indicating the usage authorization of a user who uses a service (a trial service) with which an application can be used for free for a certain time period. A license file including a product key for authenticating the regular license and a license file including a product key for authenticating the trial license are issued separately.

In this example, when it is a paid application, a license key corresponding to the application is not written in XML information for creating an application list screen. Therefore, when the application is selected from the application list screen, it is possible to employ a mode in which the control unit 114 (installer) executes control of displaying input screen prompting an input of the product key on the operation panel 27, and the input of the product key is received from the input screen. In this case, it is assumed that a user knows in advance a product key corresponding to an application to be installed in the MFP. For example, it is possible to employ a mode in which a license key is notified by mail or e-mail from a manager of the application to a user who has purchased the application. In this example, these modes are also applied to a case of a trial service application.

In the case of the trial service application, for example, a product key corresponding to the application is written in advance in XML information for creating an application list screen, and when the application is selected from the application list screen (when the installation button 8 is pressed), it is possible to employ a mode in which the control unit 114 (installer) automatically acquire a product key corresponding to the application.

The valid period information is information indicating the valid period of a license. In this example, the license information related to the usage authorization of an application is information including the license unique ID described above, the license type described above, and the valid period information described above.

The license-file reception unit 126 instructs the corresponding-information-storage control unit 126 to record information (in this example, the license information described above), among the pieces of information included in a license file received from the license management server 5, required for corresponding to an inquiry from an application described later in correspondence information described later. The corresponding-information-storage control unit 128 having received this instruction records license information included in the license file received from the license management server 5 in the correspondence information described later. Specific contents of the correspondence information are described later.

Figure 18:
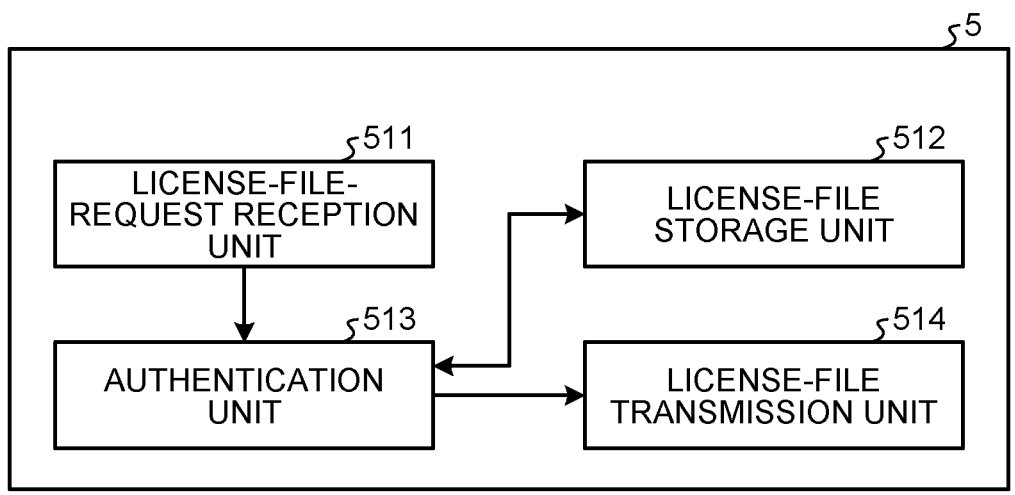
FIG. 18 is a diagram illustrating an example of functions included in a license management server included in the information processing system.

Functions included in the license management server 5 are described here. FIG. 18 is a diagram illustrating an example of functions included in the license management server 5. As illustrated in FIG. 18, the license management server 5 includes a license-file-request reception unit 511, a license-file storage unit 512, an authentication unit 513, and a license-file transmission unit 514.

The license-file-request reception unit 511 (first reception unit) receives the license file request described above from the MFP 1. The license-file storage unit 512 stores therein one or more license files (a license file for each of licensed items).

The authentication unit 513 determines whether there is a product key that matches a product key included in a license file request received by the license-file-request reception unit 511, among product keys included in the one or more license files stored in the license-file storage unit 512. When the determination result is positive, the authentication unit 513 confirms that the MFP 1 of a requesting source of the license file request has a regular license. That is, the authentication unit 513 authenticates the MFP 1 of the requesting source of the license file request, and instructs the license-file transmission unit 514 to transmit a license file corresponding to the product key included in the license file request received by the license-file-request reception unit 511 to the MFP 1. The license-file transmission unit 514 having received this instruction transmits the license file corresponding to the product key included in the license file request as a response to the license file request to the MFP 1.

The functions included in the license management server 5 described above (the license-file-request reception unit 511, the authentication unit 513, and the license-file transmission unit 514) are implemented as the CPU 211 executes a program stored in a storage device (such as the ROM 212 and the HDD 217); however, the execution of the program is not limited thereto, and for example, it is also possible that at least a part of the functions included in the application server 4 is realized by an exclusive hardware circuit (such as a semiconductor integrated circuit). Further, the license-file storage unit 512 can be realized by, for example, the HDD 217.

Referring back to FIG. 10, the explanation of detailed functions of the control unit 114 included in the MFP 1 is continued. The license-file-storage control unit 127 executes control of storing a license file received by the license-file reception unit 126 in a license-file storage unit 302. The license-file storage unit 302 can be realized by, for example, the HDD 14, the flash memory 24, and the like included in the MFP 1.

Figure 19:
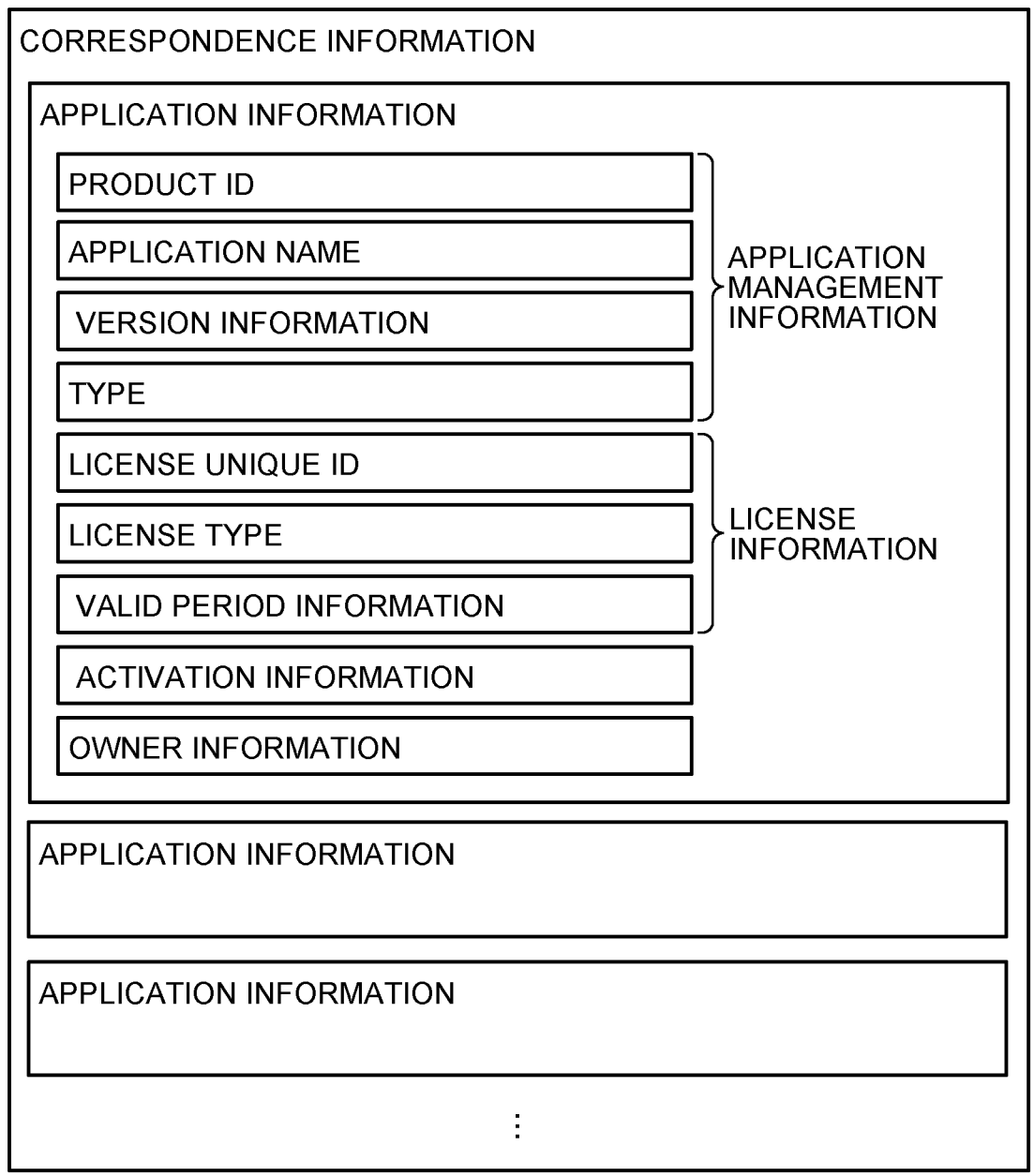
FIG. 19 is a diagram illustrating an example of correspondence information.

The correspondence-information-storage control unit 128 executes control of storing correspondence information associated with usage authorization information related to the usage authorization of an application in a correspondence-information storage unit 303, for each piece of application identification information for identifying an application installed in the MFP 1. FIG. 19 is a diagram illustrating an example of correspondence information. In the example of FIG. 19, the correspondence information is constituted by a plurality of pieces of application information corresponding to a plurality of applications (installed applications) on a one-to-one basis. In this example, the application information is constituted by application management information required for management of an application, the license information described above, activation information indicating whether the application is in an activated state, and owner information indicating an attribute of a user who has instructed installation of the application; however, the pieces of information constituting the application information are not limited thereto.

The application management information is information including a product ID, an application name, version information, and a type. The product ID is information for enabling the MFP 1 and respective servers to uniquely identify an application. The application name represents a displayed name of an application displayed on a screen and the like to cause a user to identify the application. The type is information indicating the type of software (such as application software and system software). In this example, it is possible to assume that the product ID is the application identification information, that the application name is the application identification information, and that the application management information itself is the application identification information. In the following descriptions, for convenience of explanation, there is exemplified a case of employing the product ID as the application identification information; however, the type of the application identification information is not limited thereto.

The correspondence-information storage unit 303 that stores therein the correspondence information described above can be realized by, for example, the HDD 14, the flash memory 24, and the like included in the MFP 1.

The explanation of FIG. 10 is continued here. Upon reception of license information request (first request) including a product ID (application identification information) and requesting license information (usage authorization information) from any of applications installed in the MFP 1, the specifying unit 129 specifies license information associated with the product ID included in the license information request, based on the correspondence information described above.

The notifying unit 130 notifies an application of a requesting source of the license information request of license information specified by the specifying unit 129.

In this example, when, for example, the application installed in the MFP 1 is activated or a user is to use the functions provided only with a paid application, the application transmits the license information request described above including its own product ID to the control unit 114 (installer) in order to check its own license information. Subsequently, the application can acquire its own license information as a response to the license information request. As described above, in this example, the license information includes at least valid period information indicating the period during which the application is used, and an application having acquired its own license information determines whether it is necessary to update the license information based on the present time (a system time indicated by a timer incorporated in the MFP 1) and valid period information included in the acquired license information. More specifically, when the present time (the time when the application has acquired its own license information) is within the period indicated by the valid period information included in its own license information acquired from the control unit 114, the application determines that updating of the license information is not necessary, and when the valid period information is out of the period indicated by the valid period information, the application determines that updating of the license information is necessary.

Figure 20:
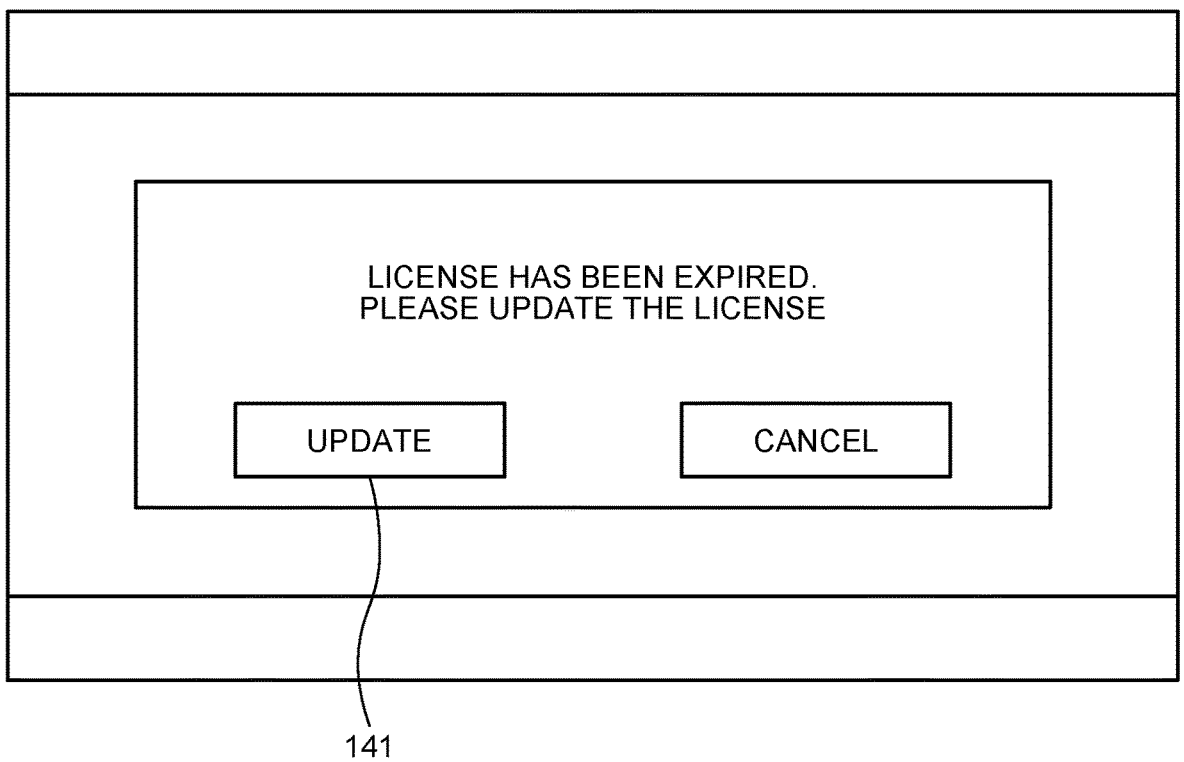
FIG. 20 is a diagram illustrating an example of a first screen.
Figure 21:
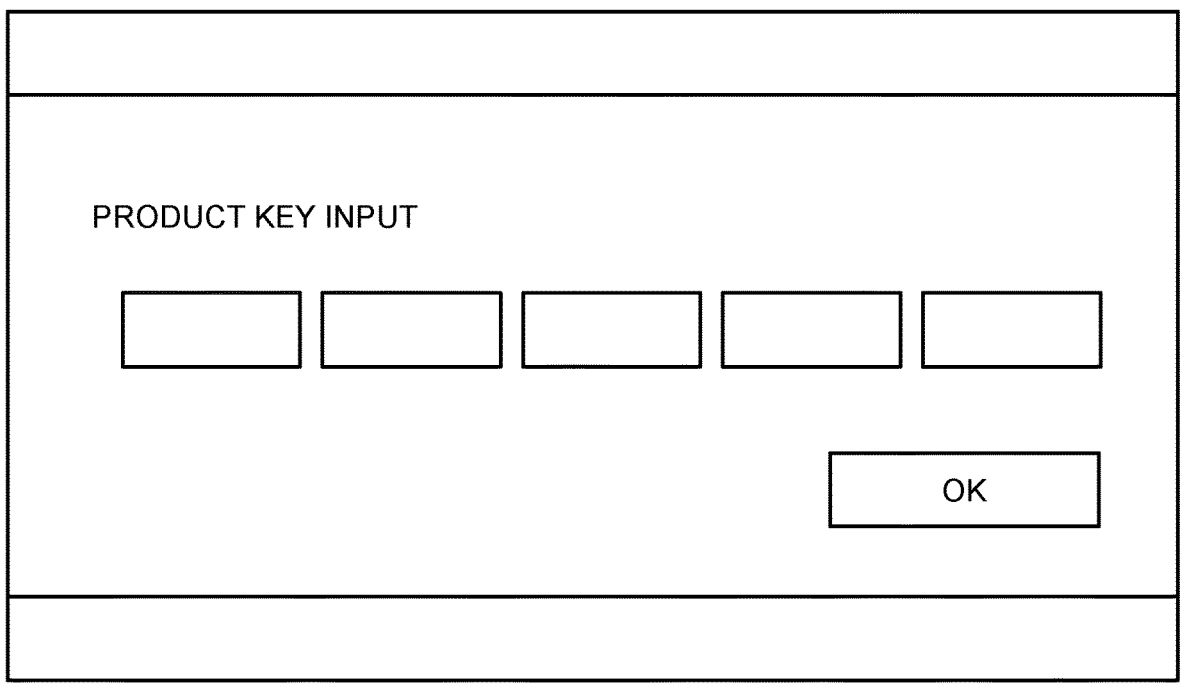
FIG. 21 is a diagram illustrating an example of a second screen.

Upon determination that updating of the license information is necessary, the application installed in the MFP 1 executes control of displaying the first screen on which an instruction for updating the license information is received. FIG. 20 is a diagram illustrating an example of the first screen. In the example of FIG. 20, on the first screen, an update button 141 for receiving an instruction for updating a license (an instruction for updating license information) is displayed. Upon reception of an instruction for updating license information from the first screen, as illustrated in FIG. 21, for example, the application installed in the MFP 1 executes control of displaying a second screen on which an input of a product key is received. Subsequently, upon reception of the input of the product key from the second screen, the application transmits an updating request (corresponding to "second request", it is possible to be regarded as "license file request" for requesting the latest license file) including the received product key and requesting updating of the license information to the update control unit 131 (a function included in the control unit 114) that executes control of updating the license information. In this example, the updating request includes pieces of information such as information (a product ID and the like) for identifying an application of a requesting source.

The explanation of FIG. 10 is continued. The update control unit 131 transmits the updating request received from the application installed in the MFP 1 to the license management server 5 that manages license information, and executes control of updating the correspondence information described above while reflecting the latest license information (license information included in the latest license information) acquired as a response to the updating request on the correspondence information.

Figure 22:
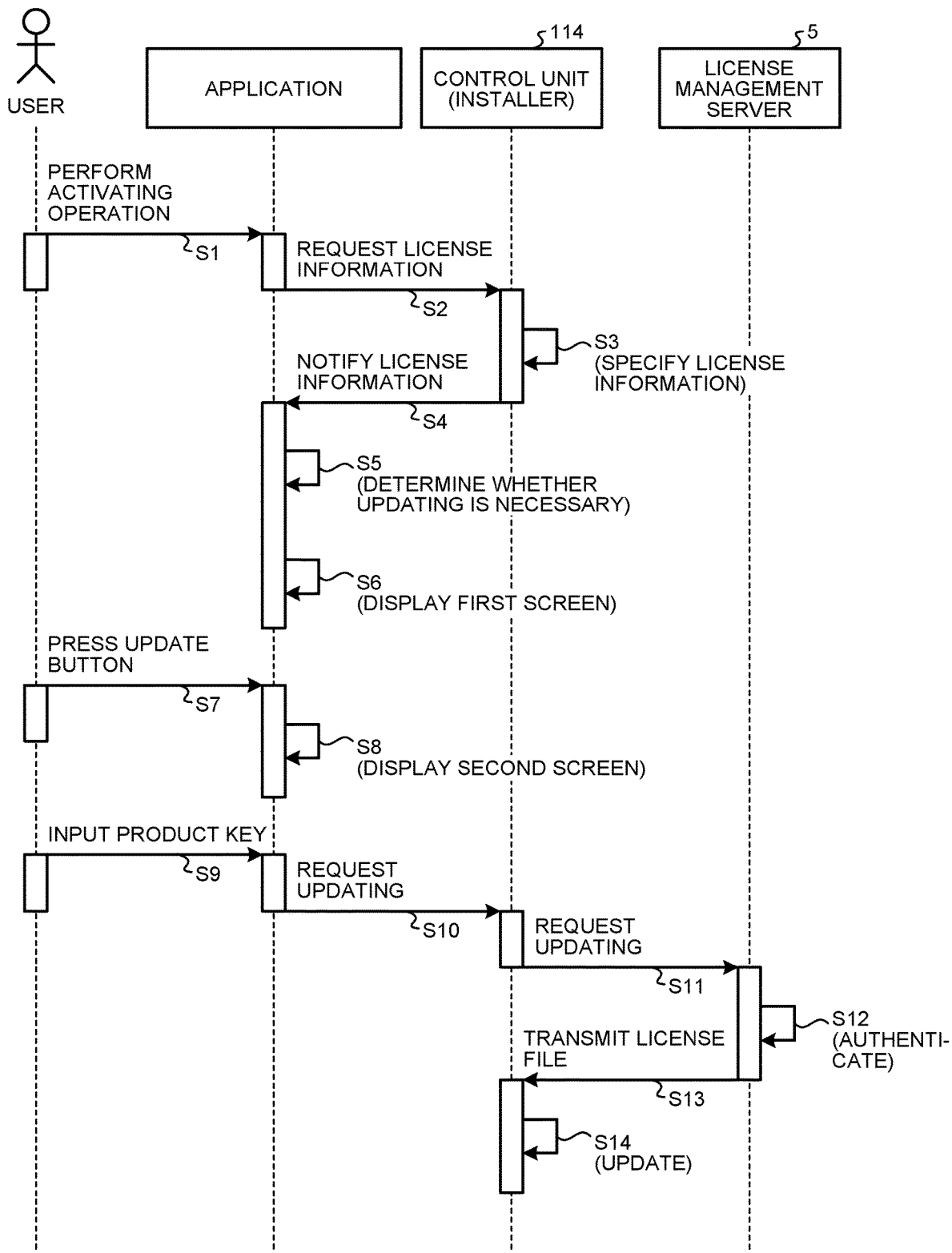
FIG. 22 is a sequence diagram illustrating an example of an operation procedure of the information processing system according.

FIG. 22 is a sequence diagram illustrating an example of an operation procedure of the information processing system 100 according to the present embodiment. First, when a user performs an operation of activating any of applications installed in the MFP 1 (such as an operation of pressing an icon on an operation screen corresponding to the application) (Step S1), the application is activated. The activated application transmits the license information request described above to the control unit 114 (installer) (Step S2). The control unit 114 (the specifying unit 129) having received the license information request specifies license information associated with a product ID included in the received license information request, based on the correspondence information described above (Step S3). Thereafter, the control unit 114 notifies an application of the requesting source of the license information request of the license information specified at Step S3 (Step S4). The control unit 114 can specify the activation information described above associated with the product ID included in the license information request received from the application to notify the application of the specified activation information.

The application having been notified of the license information from the control unit 114 as a response to the license information request checks the license information and determines whether updating of the license information is necessary (Step S5). The method for this determination is as described above. This determination is described below by exemplifying a case where the result of the determination at Step S5 is YES. The application having determined that updating of the license information is necessary executes control of displaying the first screen described above on the operation panel 27 (Step S6). When a user performs an operation of pressing the update button 141 displayed on the first screen (Step S7), the application executes control of displaying the second screen described above on the operation panel 27 (Step S8). When the user performs an operation of inputting a product key on the second screen (Step S9), the application transmits the updating request described above to the control unit 114 (Step S10). The control unit 114 transmits the updating request received from the application to the license management server 5 (Step S11).

The license management server 5 having received the updating request determines whether there is any product key that matches the product key included in the updating request, among product keys included in one or more license files stored in the license-file storage unit 512. That is, the license management server 5 performs authentication of the MFP 1 of a requesting source of the updating request (Step S12). When the MFP 1 of the requesting source of the updating request is authenticated, the license management server 5 transmits a license file corresponding to the product key included in the updating request to the MFP 1 (Step S13).

The control unit 14 (installer) having received a license file as a response to the updating request from the license management server 5 updates correspondence information while reflecting the license information included in the license file on the correspondence information (Step S14). The application of the requesting source of the updating request enters an activated state (a state where the application is regarded to have a regular license) by receiving the license file from the license management server 5 as a response to the updating request, and then the application can be used.

Figure 23:
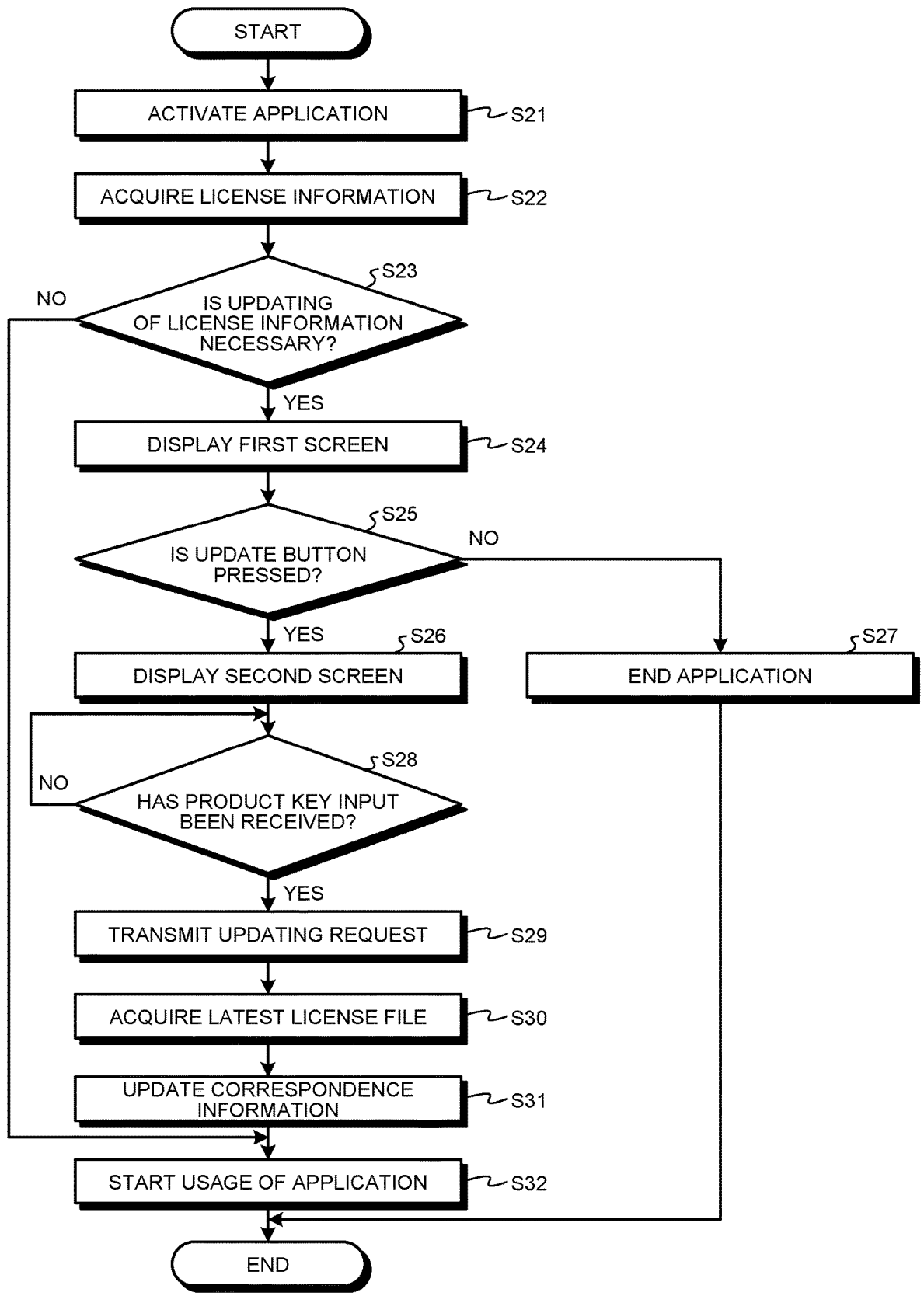
FIG. 23 is a flowchart illustrating an operation example of the MFP.

FIG. 23 is a flowchart illustrating an operation example of the MFP 1 according to the present embodiment. At Step S21 in FIG. 23, there is assumed a case where any of applications installed in the MFP 1 is activated with an activating operation by a user as a trigger. Next, the activated application acquires its own license information from the control unit 114 (installer). Specific contents of this step are as described above. Subsequently, the application checks the license information acquired at Step S22 and determines whether updating of the license information is necessary (Step S23). Specific contents of this step are as described above.

When the determination result at Step S23 is NO (NO at Step S23), the process shifts to Step S32 described later. On the other hand, when the determination result at Step S23 is YES (YES at Step S23), the application executes control of displaying the first screen described above on the operation panel 27 (Step S24). Subsequently, when pressing of the update button 141 displayed on the first screen is received (YES at Step S25), control of displaying the second screen described above on the operation panel 27 is executed (Step S26). On the other hand, when pressing of the update button 141 is not received and an instruction for not performing updating is received from the first screen (NO at Step S25), the application ends the operation (Step S27).

When an input of a product key from the second screen is received (YES at Step S28), the application transmits the updating request described above to the control unit 114, and the control unit 114 transmits the updating request received from the application to the license management server 5 (Step S29). In this case, it is assumed that the MFP 1 of a requesting source of the updating request is authenticated by the license management server 5. Thereafter, the control unit 114 acquires the latest license file as a response to the updating request (Step S30). Next, the control unit 114 updates the correspondence information described above while reflecting the license information included in the license file acquired at Step S30 on the correspondence information (Step S31). Subsequently, usage of the application is started (Step S32).

As described above, upon reception of the license information request (first request) including a product ID and requesting license information from any of applications installed in the MFP 1, the control unit 114 according to the present embodiment specifies license information associated with the product ID included in the license information request based on the correspondence information described above held in the MFP 1. The control unit 114 then notifies the application of the requesting source of the license information request of the specified license information.

Due to this notification, the installed application can check its own license information without making any inquiry to the license management server 5.

Furthermore, as described above, the license information includes at least valid period information indicating a period during which an application to which a license is given can be used, and the application installed in the MFP 1 checks the valid period information included in its own license information acquired from the control unit 114 to determine whether updating of the license information is necessary. Therefore, as compared to conventional configurations in which specific software collectively performs determination as to whether updating of license information of respective applications is necessary, it is possible to suppress enlargement of processing load on specific software (because it is possible to balance determination processes).

While an embodiment of the present invention has been described above, the present invention is not limited to the above embodiment as it is, and, at the time of carrying out the embodiment, constituent elements can be modified to embody them without departing from the scope of the embodiment. In addition, various inventions can be created by appropriately combining a plurality of constituent elements disclosed in the above embodiment. For example, several constituent elements can be omitted from all the constituent elements described in the above embodiment.

Modifications of the embodiment are describe below.

First Modification of the Embodiment

For example, it is possible to employ a mode in which the update control unit 131 does not execute control of updating license information in a case where, when the update control unit 131 receives the updating request described above from an application installed in the MFP 1, the MFP 1 is performing another process. In this example, upon reception of the updating request described above from an application, the update control unit 131 transmits "application off-line inquiry (inquiry information)" for inquiring other pieces of software of each of the operation unit 20 and the main unit 10 whether any process is not being performed, and when a response indicating that a predetermined process is being performed is received, the update control unit 131 does not execute control of updating the license information.

Figure 24:
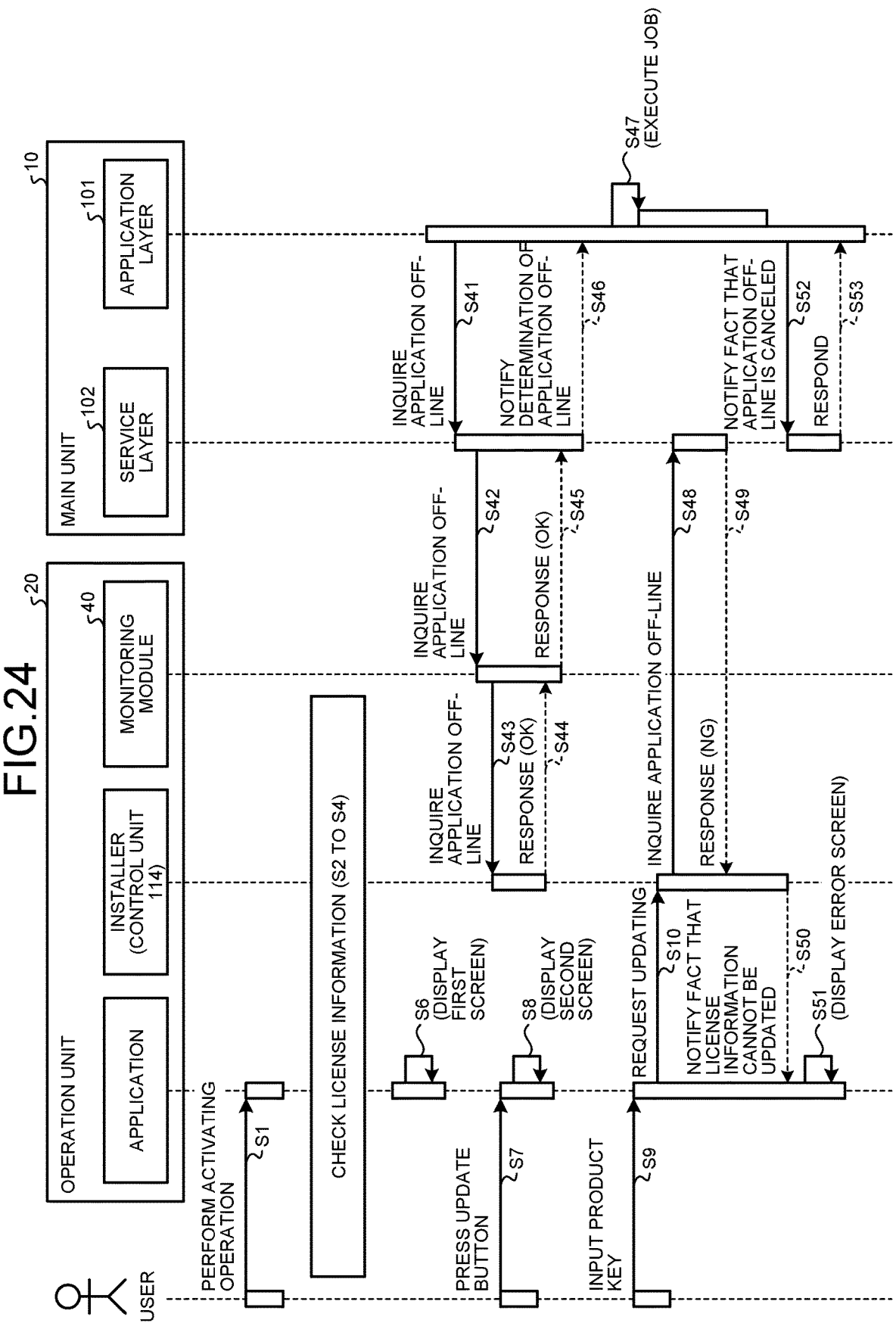
FIG. 24 is a flowchart illustrating an example of an operation procedure of an information processing system according to a modification of the embodiment.

For example, there is assumed a case where, when the update control unit 131 receives the updating request described above, another application of the MFP 1 is executing a job. In the following descriptions, a state where the MFP 1 can perform a specific process exclusively (that is, a state where any process is not being performed) is referred to as "application off-line". FIG. 24 is a sequence diagram illustrating an example of an operation procedure of the information processing system 100 in this case. As illustrated in FIG. 24, the operation unit 20 further includes a monitoring module 40 that receives an event occurred on the side of the main unit 10. In the example of FIG. 24, there is assumed a case where an application of the main unit 10 executes a job after an activating operation of the application by a user (Step S1) and during performing procedures of checking the license information described above (procedures at Steps S2 to S4 described above).

As illustrated in FIG. 24, the application of the application layer 101 of the main unit 10 transmits, to the service layer 102 of the main unit 10, "application off-line inquiry" for inquiring whether it is application off-line (Step S42), and the service layer 102 transfers the "application off-line inquiry" received from the application to other pieces of software of the main unit 10, and also transfers the "application off-line inquiry" to the operation unit 20 (Step S42). The monitoring module 40 of the operation unit 20 transfers the "application off-line inquiry" received from the main unit 10 to respective pieces of software (such as application software and system software) of the operation unit 20 (Step S43). For convenience of explanation, as the transmitting destination of the "application off-line inquiry", only an installer is described here as an example. In the example of FIG. 25, there is assumed a case where, when the installer receives the "application off-line inquiry", the installer is not performing any process. Therefore, as a response to the "application off-line inquiry", the installer returns a response indicating that the installer is not performing any process (Step S44). Subsequently, the monitoring module 40 returns responses received from the respective pieces of software to the main unit 10 (Step S45). When the service layer 102 of the main unit 10 receives, from other pieces of software of the operation unit 20 and the main unit 10, a response indicating that any process is not being performed, the service layer 102 notifies the application of an inquiry source of determination of application off-line (Step S46). The application having received this notification can start execution of a job (Step S47).

The procedures at Steps S7 to S10 illustrated in FIG. 24 are identical to those described with reference to FIG. 22. The installer (the control unit 114) having received the updating request described above at Step S10 transmits the "application off-line inquiry" described above to other pieces of software of the operation unit 20, and also transmits the "application off-line inquiry" to the main unit 10 (Step S48). At this time, in the example of FIG. 24, it is assumed that the application of the main unit 10 is executing a job, and thus the installer receives a response indicating that the installer is executing the job (Step S49). In this case, the installer notifies the application of the requesting source of the updating request described above of the fact that license information cannot be updated (Step S50). The application having received this notification executes control of displaying an error screen indicating the fact that the license information cannot be updated (Step S51). FIG. 25 is an example of the error screen. In the example of FIG. 25, the error screen displays that, in addition to the fact that the license information cannot be updated, an operation of updating the license information should be tried again after a while.

Meanwhile, the application of the main unit 10 that has been executing a job notifies the service layer 102 of the fact that the application off-line is canceled upon completion of the job (Step S52), and receives a response to this notification (Step S53). Due to this process, respective pieces of software can resume execution of processes thereof.

In the present modification, it is possible to avoid conflict between the control of updating license information and other jobs executed by the MFP 1.

Second Modification of the Embodiment

For example, it is possible to employ a mode in which, when the product key included in the updating request described above is an unauthorized one, the update control unit 131 does not execute control of updating license information. As examples in which the product key is an unauthorized one, there are cases where (1) the input format of the product key is not an authorized one, (2) the input product key is not registered in the license management server 5, and (3) a product ID (a product ID included in the updating request) of an application requesting updating of license information and a product ID included in a license file received from the license management server 5 as a response to the updating request do not match each other.

Figure 26:
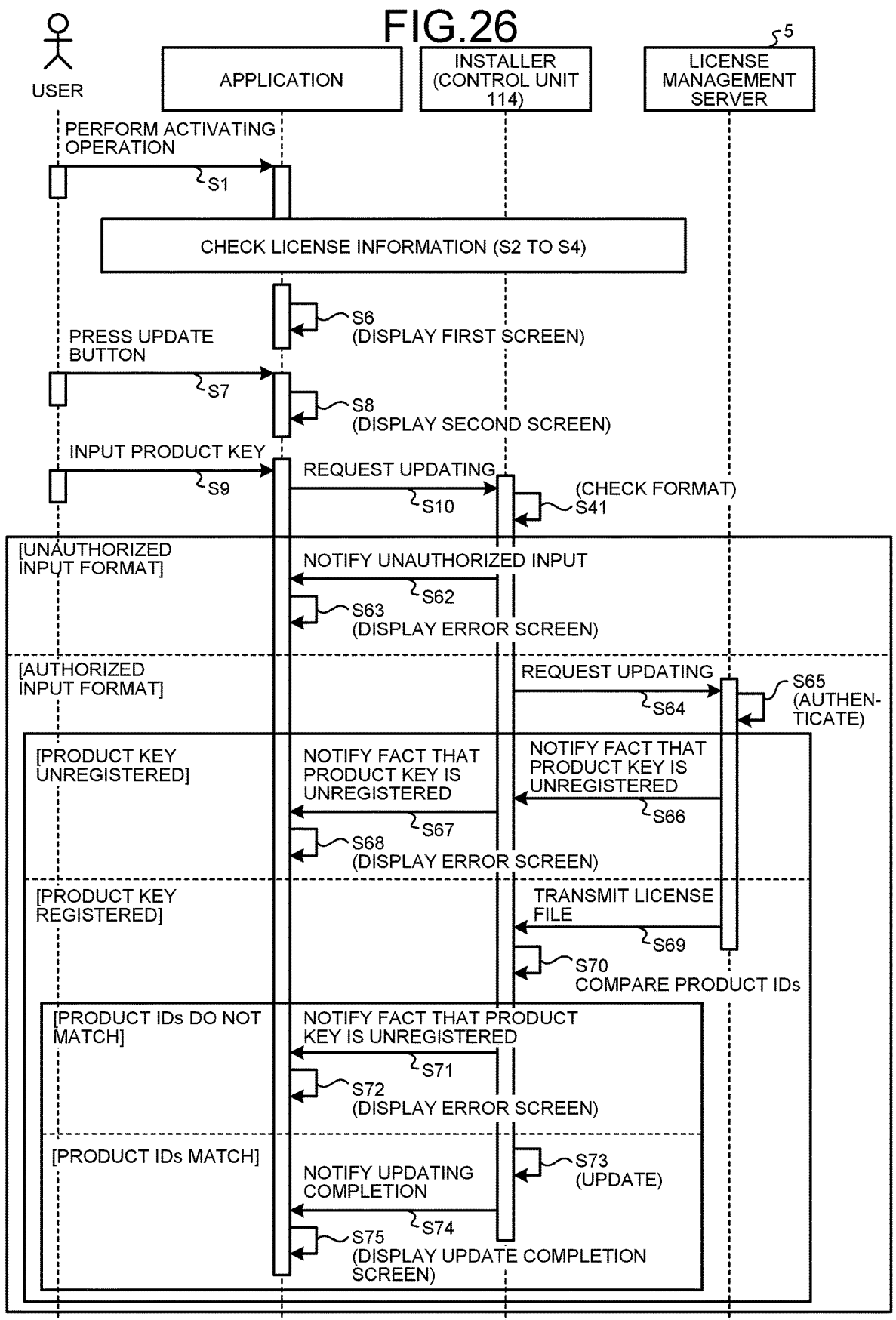
FIG. 26 is a sequence diagram illustrating an example of an operation procedure of an information processing system according to another modification of the embodiment.

FIG. 26 is a sequence diagram illustrating an example of an operation procedure of the information processing system 100 according to the second modification. The procedures from Steps S1 to S10 are identical to those described with reference to FIG. 22. The control unit 114 (installer) having received the updating request described above at Step S10 checks the format of the product key (a product key input by a user) included in the updating request (Step S61).

As a result of checking at Step S61, when the input format of the product key is an unauthorized input format, the control unit 114 notifies the application of a requesting source of the updating request described above of the fact that the input format of the product key is unauthorized (Step S62). The application having received this notification executes control of displaying an error screen indicating the fact that the license information cannot be updated because the input format of the product key is not an authorized one (Step S63).

On the other hand, as a result of checking at Step S61, when the input format of the product key is an authorized input format, the control unit 114 transmits the updating request described above to the license management server (Step S64). The license management server 5 having received the updating request determines whether there is a product key that matches the product key included in the updating request among product keys included in one or more license files stored in the license-file storage unit 512. That is, the MFP 1 of the requesting source of the updating request is authenticated (Step S65).

When there is no product key that matches the product key included in the received updating request among the product keys included in one or more license files stored in the license-file storage unit 512 (when it is an unregistered product key), the license management server 5 notifies the MFP 1 of the fact that the product key is unregistered (Step S66). The control unit 114 having received this notification notifies the application of the requesting source of the updating request of the fact that the input product key is unregistered (Step S67). The application having received this notification executes control of displaying an error screen indicating the fact that the license information cannot be updated because the input product key is unregistered (Step S68).

When there is a product key that matches the product key included in the received updating request among the product keys included in one or more license files stored in the license-file storage unit 512 (when the product key is registered), the license management server 5 transmits a license file corresponding to the product key to the MFP 1 (Step S69). The control unit 114 having received this license file compares the product ID included in the received license file and the product ID of the application of the requesting source of the updating request (Step S70).

As a result of comparison at Step S50, when these product IDs do not match each other, the control unit 114 does not perform updating of correspondence information while reflecting license information included in the license file received from the license management server 5. In this case, in order to prevent a situation where a product key, which is issued to a license of an application that is different from the application of the requesting source of the updating request described above, is known to a user through an unauthorized route, the control unit 114 notifies the application of the requesting source of the updating request of the fact that the input product key is unregistered (Step S71), and the application having received this notification executes control of displaying an error screen indicating the fact that the license information cannot be updated because the input product key is unregistered (Step S72).

On the other hand, as a result of comparison at Step S50, when these product IDs match each other, the control unit 114 updates correspondence information while reflecting the license information included in the license file received from the license management server 5 (Step S73). Subsequently, the control unit 114 notifies the application of the requesting source of the updating request described above of the fact that the updating of the license information has been completed (Step S74). In this example, the application having received this notification executes control of displaying an update completion screen indicating the fact that the updating of the license information has been completed (Step S75).

In the second modification, it is possible to guarantee that updating of license information is performed only when an authorized product key is input.

Third Modification of the Embodiment

For example, it is possible to employ a mode in which, upon reception of the updating request described above, when the MFP 1 and the license management server 5 are not connected to each other, the update control unit 131 does not execute control of updating the license information and notifies the application of the requesting source of the updating request of the fact that the control is not executed, and the application having received this notification executes control of displaying an error screen indicating the fact that the license information cannot be updated because the application cannot be connected to the license management server 5.

Figure 27:
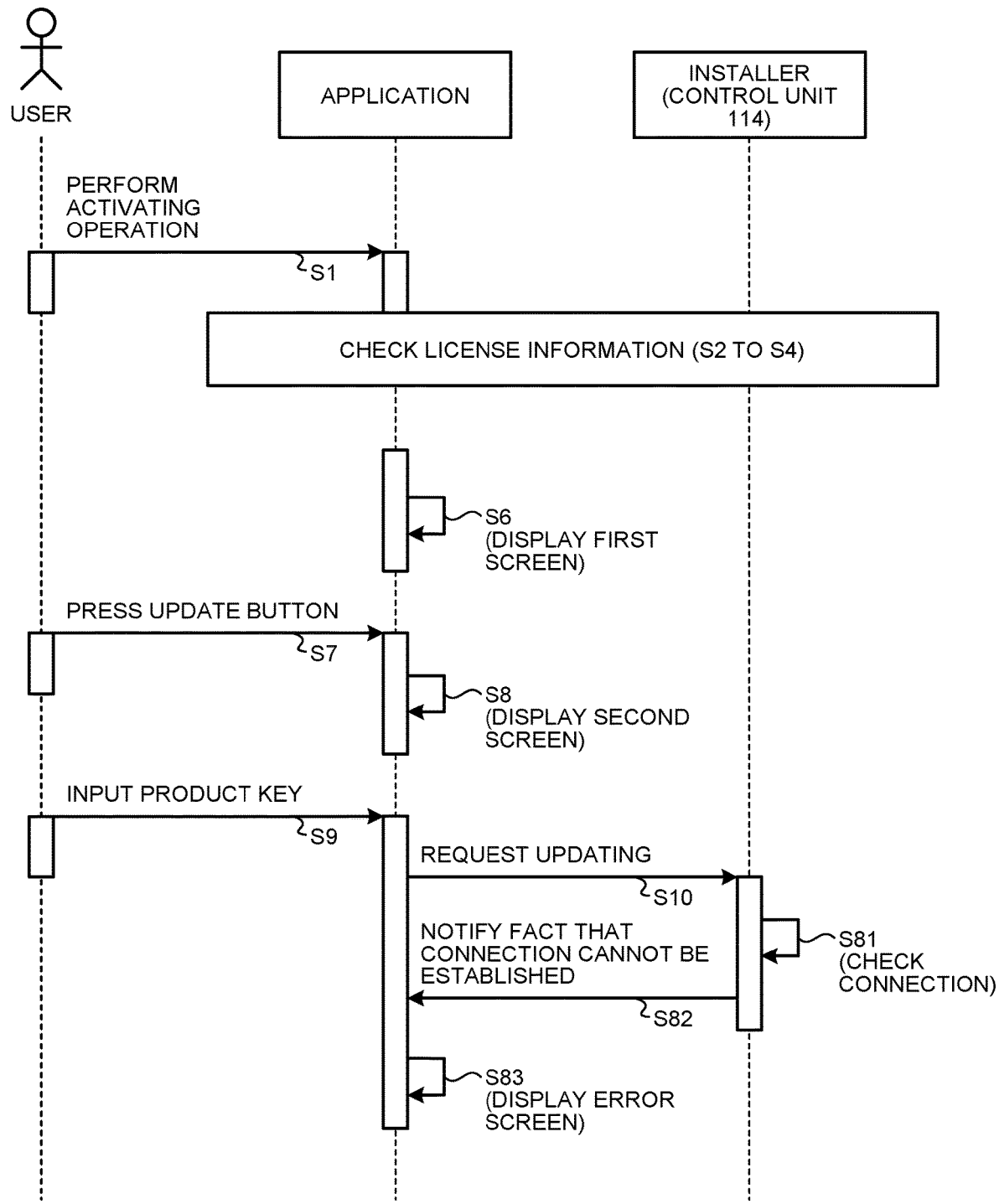
FIG. 27 is a sequence diagram illustrating an example of an operation procedure of an information processing system according to still another modification of the embodiment.

FIG. 27 is a sequence diagram illustrating an example of an operation procedure of the information processing system 100 according to the third modification. The procedures from Steps 1 to 10 are identical to those described with reference to FIG. 22. The control unit 114 (installer) having received the updating request described above at Step S10 checks whether the MFP 1 and the license management server 5 are connected to each other (Step S81). For example, in a case where the control unit 114 does not receive any response for a predetermined period of time after the updating request described above is transmitted to the license management server 5, it is possible to determine that the MFP 1 and the license management server 5 are not connected to each other, and when a response is received within the predetermined period of time, it is possible to determine that the MFP 1 and the license management server 5 are connected to each other.

In the following descriptions, a case where it is determined that the MFP 1 and the license management server 5 are not connected to each other based on a result of checking at Step S61 is described as an example. In this case, the control unit 114 notifies the application of the requesting source of the update request described above of the fact that the MFP 1 and the license management server 5 are not connected to each other (Step S82). The application having received this notification executes control of displaying an error screen indicating the fact that the license information cannot be updated because the MFP 1 and the license management server 5 are not connected to each other (Step S83).

In the third modification, when a product key for updating license information is input, if the MFP 1 and the license management server 5 are not connected to each other, updating of the license information is not performed and an error screen indicating the fact that the license information cannot be updated because connection to the license management server 5 cannot be established is displayed, and thus checking of network setting can be prompted to a user.

The embodiment and respective modifications described above can be arbitrarily combined to one another.

The program executed by the information processing system 100 according to the above embodiment can be configured to be provided as the program is recorded in a computer readable recording medium such as a CD-ROM, a flexible disk (FD), a CD-R, a DVD (Digital Versatile Disk), and a USB (Universal Serial Bus) with a file of an installable format or an executable format, or the program can be configured to be provided or distributed through a network such as the Internet. Further, it is possible to configure that various types of programs are provided as the programs are incorporated in advance in a ROM or the like.

According to exemplary embodiment and respective modifications of the present invention, an installed application can check its own license information without inquiring a license management server.

In the present invention, an operation device performing communication with a device main body can suppress a CPU using rate and prevent influence on operation of the device main body when an application of the operation device performs communication with the device main body using a communication channel.

The above-described embodiment and respective modifications are illustrative and do not limit the present invention. Thus, numerous additional modifications and variations are possible in light of the above teachings. For example, at least one element of different illustrative and exemplary embodiment and respective modifications herein may be combined with each other or substituted for each other within the scope of this disclosure and appended claims. Further, features of components of the embodiment, such as the number, the position, and the shape are not limited the embodiment and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing apparatus comprising:
   a memory, configured to store correspondence information associating application identification information, identifying applications installed on the information processing apparatus, with usage authorization information, related to usage authorization of the applications;
   at least one processor configured to,
      specify, upon a first request being received from an application of the applications including the application identification information and requesting the usage authorization information, the usage authorization information stored in the memory in association with the application identification information included in the first request, based on the correspondence information, and
      notify the application of the usage authorization information specified,
   wherein the usage authorization information includes at least valid period information indicating a period during which the application can be used, and the application, upon acquisition of the usage authorization information as a response to the first request, is configured to determine whether updating of the usage authorization information is necessary based on a present time and valid period information, included in the usage authorization information acquired,
   wherein the application, upon determining that updating of the usage authorization information is necessary, is configured to execute control of displaying a first screen receiving an instruction for updating the usage authorization information,
   wherein the application, upon reception of an instruction for updating the usage authorization information from the first screen, is configured to execute control of displaying a second screen receiving an input of a product key for authenticating the usage authorization, and
   the application, upon reception of an input of the product key from the second screen, is configured to transmit a second request including the received product key and requesting updating of the usage authorization for execution of control of updating the usage authorization information.

2. The information processing apparatus of claim 1, wherein
   the at least one processor is configured to control transmission of the second request received from the application to a server that manages the usage authorization information, and is configured to execute control of updating the correspondence information while reflecting latest one of the usage authorization information acquired as a response to the second request on the correspondence information.

3. The information processing apparatus of claim 2, wherein
the at least one processor, upon reception of the second request and upon the information processing apparatus is performing another process, does not execute control of updating the usage authorization information.

4. The information processing apparatus of claim 2, wherein
the at least one processor, upon the usage authorization authentication information included in the second request being an unauthorized one, does not execute control of updating the usage authorization information.

5. The information processing apparatus of claim 2, wherein
the at least one processor, upon reception of the second request from an application and upon the information processing apparatus and the server not being connected to each other, does not execute control of updating the usage authorization information, and is configured to notify the application of a fact that the information processing apparatus and the server are not connected to each other, and
the application, having received the notification, is configured to execute control of displaying an error screen indicating that the usage authorization information cannot be updated because the application cannot be connected to the server.

6. The information processing apparatus of claim 1, further comprising:
at least one other processor, configured to receive an operation; and configured to perform an operation corresponding to the operation received, and
a memory, to store the installed application and software for receiving a request from the installed application, providing a function to the at least one other processor of performing a process corresponding to a received request.

7. The information processing apparatus of claim 6, wherein
upon reception of the second request, the at least one other processor is configured to transmit, to other pieces of software of the at least one processor, inquiry information for inquiring whether there is any process being performed, and upon a response indicating a process is being performed is received, the at least one other processor does not execute control of updating the usage authorization information.

8. The information processing apparatus of claim 1, wherein the information processing apparatus is an image forming apparatus including a scanner function or a printer function, to execute a job of image formation, the image forming apparatus further comprising:
an operation panel to enable performance of an operation for the job; and
at least one circuitry to
acquire, from an external device, license information indicating usage authorization of an application installed in the image forming apparatus,
display, on the operation panel, an input screen usable to update the license information upon determining, based on the license information acquired, that the usage authorization of the application has been lost, and
acquire updated license information from the external device based on an input via the input screen, to update the license information with the updated license information acquired.

9. The information processing apparatus of claim 8, wherein the at least one circuitry is not configured to update the license information during execution of the job of image formation, and is configured to update the license information after the job of image formation is completed.

10. The information processing apparatus of claim 1, wherein, in an application list screen displaying a list of applications installable in the information processing apparatus, upon selection of a paid application, an input screen prompts an input of the product key, and upon selection of a free application, the product key is automatically acquired based on information in the application list screen.

11. The information processing apparatus of claim 10, configured to connect, via a network, with an application market server, the application market server being configured to provide the application list screen to the information processing apparatus,
wherein a component server is configured to determine whether conditions for using an application selected from the application list screen are satisfied, and upon the conditions being satisfied, the component server being configured to transmit a URL indicating a location of an application server managing the application to the information processing apparatus,
wherein the application server is accessed by specifying the URL received from the component server, to download the application selected from the application list screen into the information processing apparatus, and
wherein a license management server is configured to, in response to receiving a license file request including the product key and requesting a license file corresponding to the product key from the information processing apparatus, transmit the license file corresponding to the product key to the information processing apparatus.

12. A non-transitory computer-readable recording medium storing a computer program to, when executed, cause a computer to execute:
specifying, upon reception of, from an application installed on the computer, a first request including application identification information for identifying the application and requesting usage authorization information related to a usage authorization of the application, the usage authorization information associated with the application identification information included in the first request, based on correspondence information stored in a memory storing the correspondence information associating the usage authorization information with the application identification information; and
notifying the application of the usage authorization information specified at the specifying,
wherein the usage authorization information includes at least valid period information indicating a period during which the application can be used, and the application, upon acquisition of the usage authorization information as a response to the first request, is configured to cause the computer to determine whether updating of the usage authorization information is necessary based on a present time and valid period information, included in the usage authorization information acquired,
wherein the application, upon determining that updating of the usage authorization information is necessary, is configured to cause the computer to execute control of displaying a first screen receiving an instruction for updating the usage authorization information, wherein the application, upon reception of an instruction for updating the usage authorization information from the first screen, is configured to cause the computer to execute control of displaying a second screen receiving an input of a product key for authenticating the usage authorization, and wherein the application, upon reception of an input of the product key from the second screen, is configured to cause the computer to execute transmission of a second request including the received product key and requesting updating of the usage authorization information for execution of control of updating the usage authorization information.

13. The non-transitory computer-readable recording medium of claim 12, wherein the computer is further configured to execute control of transmission of the second request received from the application to a server that manages the usage authorization information, and is configured to execute control of updating the correspondence information while reflecting latest one of the usage authorization information acquired as a response to the second request on the correspondence information.

\* \* \* \* \*